(12) United States Patent
Kondo et al.

(10) Patent No.: US 7,672,914 B2
(45) Date of Patent: Mar. 2, 2010

(54) APPARATUS AND METHOD FOR GENERATING COEFFICIENT DATA, APPARATUS AND METHOD FOR GENERATING COEFFICIENT-SEED DATA, INFORMATION-SIGNAL PROCESSING APPARATUS, PROGRAM, AND MEDIUM HAVING RECORDED THE PROGRAM THEREON

(75) Inventors: Tetsujiro Kondo, Tokyo (JP); Daisuke Kikuchi, Tokyo (JP); Shizuo Chikaoka, Tokyo (JP); Takeshi Miyai, Tokyo (JP); Takashi Nakanishi, Tokyo (JP); Tsugihiko Haga, Kanagawa (JP); Yoshiaki Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 583 days.

(21) Appl. No.: 11/096,044

(22) Filed: Mar. 31, 2005

(65) Prior Publication Data

US 2005/0226537 A1    Oct. 13, 2005

(30) Foreign Application Priority Data

Apr. 2, 2004  (JP) ............................ P2004-109718

(51) Int. Cl.
*G06E 1/00*      (2006.01)
*G06E 3/00*      (2006.01)
(52) U.S. Cl. ........................ 706/20; 345/63; 375/232; 382/240
(58) Field of Classification Search ................ 704/255, 704/239; 706/15, 16; 382/162, 246
See application file for complete search history.

(56) References Cited

U.S. PATENT DOCUMENTS 4,881,270 A * 11/1989 Knecht et al. ............... 382/191

5,581,308 A * 12/1996 Lee ............................ 348/699
7,028,214 B2 *  4/2006 Takashi et al. ................ 714/5
2003/0044087 A1 *  3/2003 Kondo et al. ............... 382/298

FOREIGN PATENT DOCUMENTS

JP       2000 200349       7/2000

OTHER PUBLICATIONS

Patent Abstracts of Japan, Publication No. 2003-316760, Publication Date Nov. 7, 2003.
Patent Abstracts of Japan, Publication No. 2001-008056, Publication Date Jan. 12, 2001.

\* cited by examiner

*Primary Examiner*—David R Vincent
*Assistant Examiner*—Kalpana Bharadwaj
(74) *Attorney, Agent, or Firm*—Frommer Lawrence & Haug LLP; William S. Frommer; Thomas F. Presson

(57) ABSTRACT

A coefficient-data generating apparatus generates coefficient data of an estimating equation used to convert a first information signal including pieces of information data into a second information signal including pieces of information data. The coefficient-data generating apparatus includes a determining unit determining whether a subject point in a second learning signal corresponding to the second information signal is a feature point having a predetermined feature; a data selector selecting pieces of information data at adjacent points of the subject point in the second learning signal, based on a first learning signal corresponding to the first information signal; and a calculator calculating the coefficient data using information data at the subject point in the second learning signal, the subject point being determined as the feature point by the determining unit, and the pieces of information data selected in association with the subject point by the data selector.

22 Claims, 16 Drawing Sheets

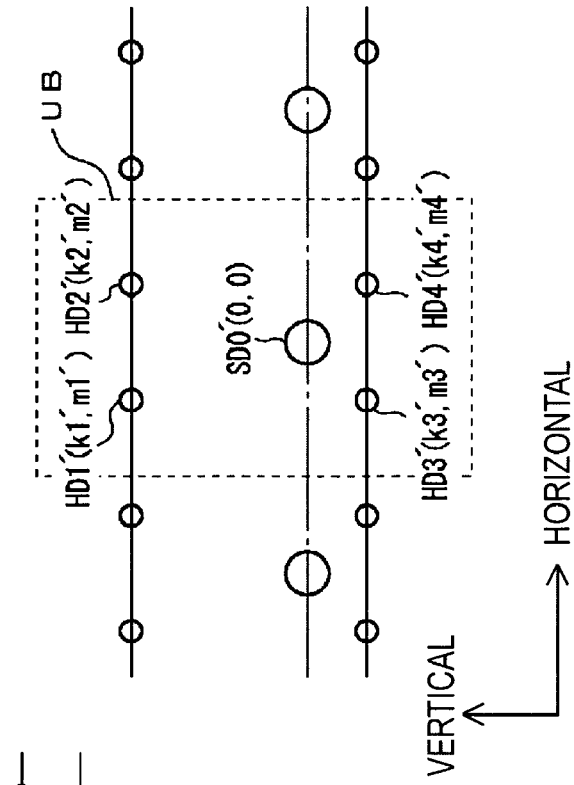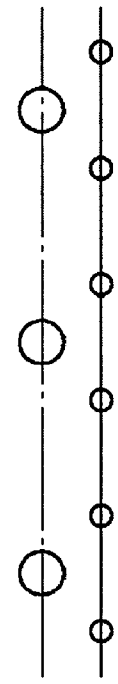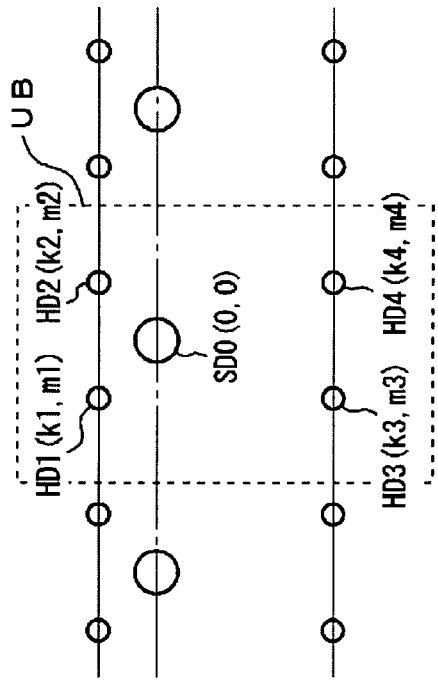

APPARATUS AND METHOD FOR GENERATING COEFFICIENT DATA, APPARATUS AND METHOD FOR GENERATING COEFFICIENT-SEED DATA, INFORMATION-SIGNAL PROCESSING APPARATUS, PROGRAM, AND MEDIUM HAVING RECORDED THE PROGRAM THEREON

CROSS REFERENCES TO RELATED APPLICATIONS

The present invention contains subject matter related to Japanese Patent Application JP 2004-109718 filed in the Japanese Patent Office on Apr. 2, 2004, the entire contents of which are incorporated herein by reference.

BACKGROUND OF THE INVENTION

1. Field of the Invention

The present invention relates to apparatuses and methods for generating coefficient data used in an estimating equation that is used to convert a first information signal into a second information signal, or coefficient-seed data that is used as coefficient data in a generating equation for generating the coefficient data, apparatuses for converting the first information signal into the second information signal using the coefficient data or the coefficient-seed data, programs for allowing a computer to execute the method of generating coefficient data or coefficient-seed data, and to media having recorded the programs thereon.

More specifically, the present invention relates to techniques for obtaining coefficient data or coefficient-seed data that allows accurate reproduction of information data at a feature position having a predetermined feature using learning data including only information data at the feature position having the predetermined feature in a teacher signal when coefficient data for an estimating equation that is used to convert a first information signal into a second information signal or coefficient-seed data for generating the coefficient data is obtained by performing learning using a student signal corresponding to the first information signal and a teacher signal corresponding to the second information signal, so that the quality of an output composed of the second information signal is improved.

2. Description of the Related Art

Recently, various techniques for improving the resolution or sampling frequency of image signals or audio signals have been proposed. For example, it is known that when up conversion from a standard television signal having a standard or low resolution to an HDTV signal having a high resolution is performed or when sub-sampling interpolation is performed, more favorable results can be obtained by a method based on classification and adaptation than a method based on interpolation.

In the method based on classification and adaptation, when converting a standard television signal having a standard or low resolution (SD signal) into a signal having a high resolution (HD signal), a class to which pixel data at a subject pixel position in the HD signal is detected, and using coefficient data for an estimating equation associated with the class, pixel data at the subject pixel position in the HD signal is generated from a plurality of pieces of pixel data in the SD signal. The coefficient data for the estimating equation, used in the conversion involving classification, is determined for each class by performing learning, for example, by the least square method.

For example, according to Japanese Unexamined Patent Application Publication No. 2003-316760 (e.g., pp. 13 to 17 and FIGS. 4 to 7), using teacher data that serves as a teacher in learning and student data that serves as a student in learning, relationship between the teacher data and the student data is learned while weighting the teacher data and the student data based on activities (dynamic range) of prediction taps generated from the student data, obtaining tap coefficients (coefficient data) that improve the accuracy of prediction over the entire dynamic range of prediction taps.

As another example, according to Japanese Unexamined Patent Application Publication No. 2001-8056 (e.g., pp. 15 to 20 and FIGS. 9 to 12), prediction coefficients (coefficient data) for obtaining an image having a high S/N ratio from an image having a low S/N ratio is obtained by performing learning using high-S/N images that serve as teachers in learning and low-S/N images that serve as students in learning. First, prediction coefficients are obtained using learning data corresponding to all high-S/N pixels constituting high S/N images, and then prediction coefficients are obtained using only learning data corresponding to high-S/N pixels for which prediction error of predicted values obtained using the prediction coefficients obtained is not small, and similar processing is repeated. Accordingly, for all the high-S/N pixels constituting high-S/N images, prediction coefficients that reduce prediction error is obtained for each group of several high-S/N pixels.

SUMMARY OF THE INVENTION

As described in Japanese Unexamined Patent Application Publication No. 2003-316760 and Japanese Unexamined Patent Application Publication No. 2001-8056, in the coefficient-data generating apparatuses (learning apparatuses) according to the related art, coefficient data is obtained using learning data corresponding to the pixels of a teacher image irrespective of the features of the respective pixels of the teacher image. That is, coefficient data with which the pixels of an HD image or a high S/N image are predicted by average performance is obtained.

However, the contributions of the respective pixels constituting an HD image or high-S/N image to image quality are not uniform. Thus, it is possible to improve the overall image quality by lowering prediction performance for pixels with low contributions to image quality while enhancing prediction performance for pixels with high contributions to image quality.

It is desirable to improve the quality of an output composed of a second information signal that is obtained by converting a first information signal using coefficient data or coefficient-seed data.

According to an embodiment of the present invention, a coefficient-data generating apparatus is provided. The coefficient-data generating apparatus generates coefficient data of an estimating equation that is used to convert a first information signal including a plurality of pieces of information data into a second information signal including a plurality of pieces of information data. The coefficient-data generating apparatus includes determining means for determining whether a subject point in a second learning signal corresponding to the second information signal is a feature point having a predetermined feature; data selecting means for selecting a plurality of pieces of information data at adjacent points of the subject point in the second learning signal, based on a first learning signal corresponding to the first information signal; and calculating means for calculating the coefficient data using information data at the subject point in the second learning signal, the subject point being determined as the feature point by the determining means, and the plurality of pieces of information data selected in association with the subject point by the data selecting means.

According to another embodiment of the present invention, a coefficient-data generating method is provided. The coefficient-data generating method generates coefficient data of an estimating equation that is used to convert a first information signal including a plurality of pieces of information data into a second information signal including a plurality of pieces of information data. The coefficient-data generating method includes the steps of determining whether a subject point in a second learning signal corresponding to the second information signal is a feature point having a predetermined feature; selecting a plurality of pieces of information data at adjacent points of the subject point in the second learning signal, based on a first learning signal corresponding to the first information signal; and calculating the coefficient data using information data at the subject point in the second learning signal, the subject point being determined as the feature point in the determining step, and the plurality of pieces of information data selected in association with the subject point in the selecting step.

According to another embodiment of the present invention, a program that allows a computer to execute the coefficient-data generating method described above is provided. According to another embodiment of the present invention, a computer-readable medium having recorded thereon the program is provided.

According to another embodiment of the present invention, an information-signal processing apparatus is provided. The information-signal processing apparatus converts a first information signal including a plurality of pieces of information data into a second information signal including a plurality of pieces of information data. The information-signal processing apparatus includes data selecting mans for selecting a plurality of pieces of information data at adjacent points of a subject point in the second information signal, based on the first information signal; storage means for storing coefficient data of an estimating equation; and calculating means for calculating information data at the subject point in the second information signal according to the estimating equation, using the plurality of pieces of information data selected by the data selecting means and the coefficient data stored in the storage means. The coefficient data is generated by the coefficient-data generating apparatus or the coefficient-data generating method described above.

According to these embodiments of the present invention, it is determined whether a subject point in a second learning signal corresponding to a second information signal is a feature point having a predetermined feature. The information signal is, for example, an image signal or an audio signal. When the information signal is an image signal, information data refers to pixel data of each pixel. When the information signal is an audio signal, information data refers to sample data.

For example, whether the subject point is the feature point is determined using information data at the subject point in the second learning signal and a plurality of pieces of information data at the adjacent points, selected based on the second learning signal. In that case, by obtaining the information data at the subject point and the information data at the adjacent points via a low-band rejecting filter, it is possible to determine whether the subject point is the feature point based on only high-band components.

For example, that the subject point is determined as the feature point when the information data at the subject point is greater than a maximum value of the plurality of pieces of information data at the adjacent points or less than a minimum value of the plurality of pieces of information data at the adjacent points.

As another example, the subject point is determined as the feature point when the information data at the subject point coincides with a median of the plurality of pieces of information data at the adjacent points or a median of the information data at the subject point and the plurality of pieces of information data at the adjacent points. Coincidence herein refers to a case where the information data at the subject point exactly coincides with the median, and also refers to a case where the information data at the subject point is within a predetermined range above and below the median.

Furthermore, based on a student signal corresponding to the first information signal, a plurality of pieces of information data at adjacent points of the subject point in the second learning signal is selected. Then, using the information data at the subject point in the second learning signal, determined as the feature point, and the plurality of pieces of information data selected in association with the subject point, coefficient data is calculated. Furthermore, by detecting a class to which the information data at the subject point in the second learning signal belongs, it is possible to calculate coefficient data for each class.

For example, a normal equation for calculating coefficient data is generated using the information data at the subject point in the second learning signal, determined as the feature point, and the plurality of pieces of information data selected in association with the subject point, and coefficient data is calculated by solving the normal equation.

The coefficient data generated as described above is used to convert a first information signal into a second information signal. For this purpose, a plurality of pieces of information data at adjacent points of a subject point in the second information signal is selected based on the first information signal. Then, using the plurality of pieces of information data and the coefficient data described above, information data at the subject point in the second information signal is calculated according to an estimating equation.

As described above, according to the embodiments of the present invention, coefficient data is generated using learning data including only information data at feature points having predetermined features in a second learning signal. Thus, it is possible to obtain coefficient data that allows accurate reproduction of information data at the feature positions having the features. This serves to improve the quality of an output that is obtained based on a second information signal obtained by converting a first information signal using the coefficient data.

According to another embodiment of the present invention, a coefficient-seed-data generating apparatus is provided. The coefficient-seed-data generating apparatus generates coefficient-seed data of a generating equation for generating coefficient data of an estimating equation that is used to convert a first information signal including a plurality of pieces of information data into a second information signal including a plurality of pieces of information data. The coefficient-seed-data generating apparatus includes parameter inputting means for receiving input of a value of a parameter that determines quality of an output that is obtained based on a first learning signal corresponding to the first information signal, the parameter corresponding to a parameter included in the generating equation; determining means for determining whether a subject point in a second learning signal corresponding to the second information signal is a feature point having a predetermined feature; data selecting means for selecting a plurality of pieces of information data at adjacent points of the subject point in the second learning signal, based on the first learning signal; and calculating means for calculating the coefficient-seed data using information data at the subject point in the second learning signal, the subject point being determined as the feature point by the determining means, the plurality of pieces of information data selected in association with the subject point by the data selecting means, and the value of the parameter input to the inputting means.

According to another embodiment of the present invention, a coefficient-seed-data generating method is provided. The coefficient-seed-data generating method generates coefficient-seed data of a generating equation for generating coefficient data of an estimating equation that is used to convert a first information signal including a plurality of pieces of information data into a second information signal including a plurality of pieces of information data. The coefficient-seed-data generating method includes the steps of obtaining a value of a parameter that determines quality of an output that is obtained based on a first learning signal corresponding to the first information signal, the parameter corresponding to a parameter included in the generating equation; determining whether a subject point in a second learning signal corresponding to the second information signal is a feature point having a predetermined feature; selecting a plurality of pieces of information data at adjacent points of the subject point in the second learning signal, based on the first learning signal; and calculating the coefficient-seed data using information data at the subject point in the second learning signal, the subject point being determined as the feature point in the determining step, the plurality of pieces of information data selected in association with the subject point in the selecting step, and the value of the parameter obtained in the obtaining step.

According to another embodiment of the present invention, a program that allows a computer to execute the coefficient-seed-data generating method described above is provided. According to another embodiment of the present invention, a computer-readable medium having recorded thereon the program is provided.

According to another embodiment of the present invention, an apparatus for converting a first information signal including a plurality of pieces of information data into a second information signal including a plurality of pieces of information data is provided. The apparatus includes data selecting means for selecting a plurality of pieces of information data at adjacent points of a subject point in the second information signal, based on the first information signal; parameter inputting means for receiving input of a value of a parameter that determines quality of an output that is obtained based on the second information signal; storage means for storing coefficient-seed data that serves as coefficient data of a generating equation for generating coefficient data of an estimating equation, the generating equation including the parameter; coefficient-data generating means for generating coefficient data of the estimating equation according to the generating equation in accordance with the value of the parameter input to the parameter inputting means, using the coefficient-seed data stored in the storage means and the value of the parameter input to the parameter inputting means; and calculating means for calculating information data at a subject point in the second information signal according to the estimating equation, using the plurality of pieces of information data selected by the data selecting means and the coefficient data generated by the coefficient-data generating means. The coefficient-seed data is generated by the coefficient-seed-data generating apparatus or the coefficient-seed-data generating method described above.

According to these embodiments of the present invention, a value of a parameter that determines the quality of an output that is obtained based on a first learning signal corresponding to a first information signal is input. Furthermore, it is determined whether a subject point in a second learning signal corresponding to a second information signal is a feature point having a predetermined feature. The information signal is, for example, an image signal or an audio signal. When the information signal is an image signal, information data refers to pixel data of each pixel. When the information signal is an audio signal, information data refers to sample data.

For example, whether the subject point is the feature point is determined using information data at the subject point in the second learning signal and a plurality of pieces of information data at the adjacent points, selected based on the second learning signal. In that case, by obtaining the information data at the subject point and the information data at the adjacent points via a low-band rejecting filter, it is possible to determine whether the subject point is the feature point based on only high-band components.

For example, that the subject point is determined as the feature point when the information data at the subject point is greater than a maximum value of the plurality of pieces of information data at the adjacent points or less than a minimum value of the plurality of pieces of information data at the adjacent points.

As another example, the subject point is determined as the feature point when the information data at the subject point coincides with a median of the plurality of pieces of information data at the adjacent points or a median of the information data at the subject point and the plurality of pieces of information data at the adjacent points. Coincidence herein refers to a case where the information data at the subject point exactly coincides with the median, and also refers to a case where the information data at the subject point is within a predetermined range above and below the median.

Furthermore, based on the first learning signal, a plurality of pieces of information data at adjacent points of the subject point in the second learning signal is selected. Then, using the information data at the subject point in the second learning signal, determined as the feature point, the plurality of pieces of information data selected in association with the subject point, and the value of the parameter, coefficient-seed data is calculated. Furthermore, by detecting a class to which the information data at the subject point in the second learning signal belongs, it is possible to calculate coefficient-seed data for each class.

For example, a normal equation for calculating coefficient-seed data is generated using the information data at the subject point in the second learning signal, determined as the feature point, the plurality of pieces of information data selected in association with the subject point, and the value of the parameter, and coefficient-seed data is calculated by solving the normal equation.

The coefficient-seed data generated as described above is used to convert a first information signal into a second information signal. For this purpose, a value of a parameter that determines the quality of an output that is obtained based on the second information signal is input. Then, using the plurality of pieces of information data and the coefficient data described above, information data at the subject point in the second information signal is calculated according to an estimating equation.

As described above, according to the embodiments of the present invention, coefficient-seed data is generated using learning data including only information data at feature points having predetermined features in a second learning signal. Thus, it is possible to obtain coefficient-seed data that allows accurate reproduction of information data at the feature positions having the features. This serves to improve the quality of an output that is obtained based on a second information signal obtained by converting a first information signal using the coefficient-seed data.

BRIEF DESCRIPTION OF THE DRAWINGS

FIGS. 4A and 4B are diagrams showing phase shifts of four pixels of a unit pixel block of an HD signal with respect to central prediction taps in an odd-numbered field and an even-numbered field;

DESCRIPTION OF THE PREFERRED EMBODIMENTS

Figure 1:
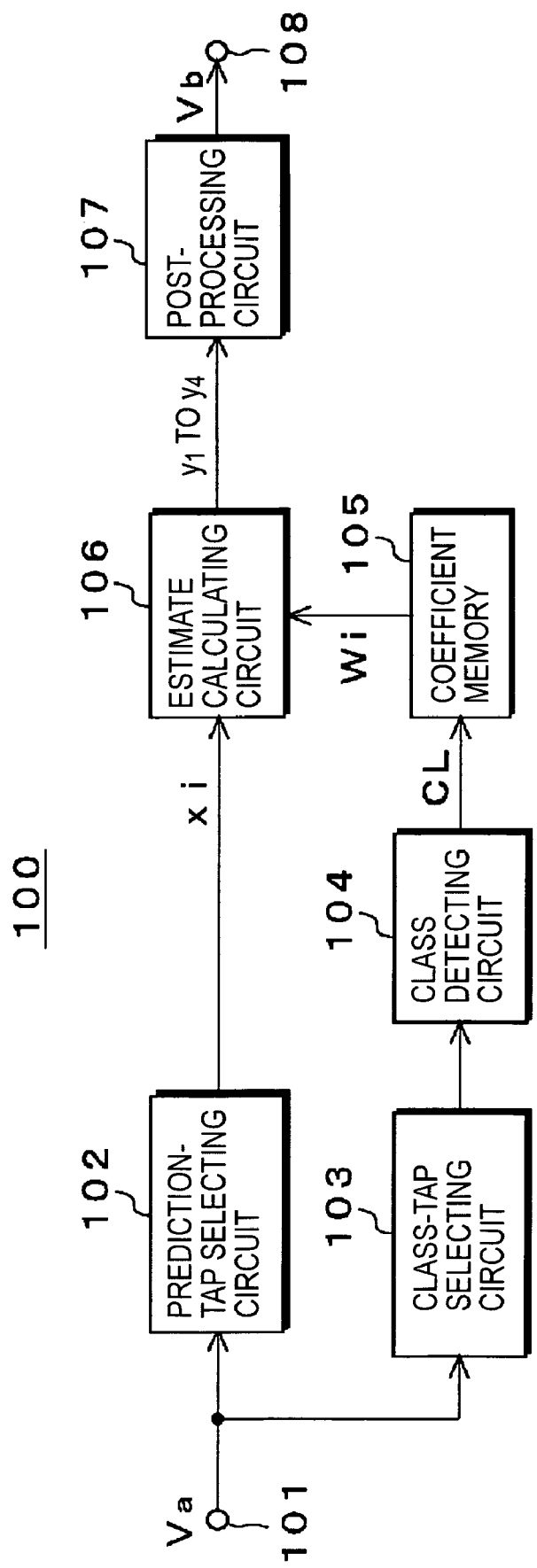
FIG. 1 is a block diagram showing the construction of an image-signal processing apparatus according to a first embodiment of the present invention.

Now, a first embodiment of the present invention will be described. FIG. 1 shows the construction of an image-signal processing apparatus 100 according to the first embodiment. The image-signal processing apparatus 100 converts an image signal Va that is a standard definition (SD) signal referred to as a 525i signal into an image signal Vb that is a high definition (HD) signal referred to as a 1050i signal. The image signal Va constitutes a first information signal, and the image signal Vb constitutes a second information signal. The 525i signal is an interlaced image signal having 525 lines per frame. The 1050i signal is an interlaced image signal having 1,050 lines per frame.

Figure 2:
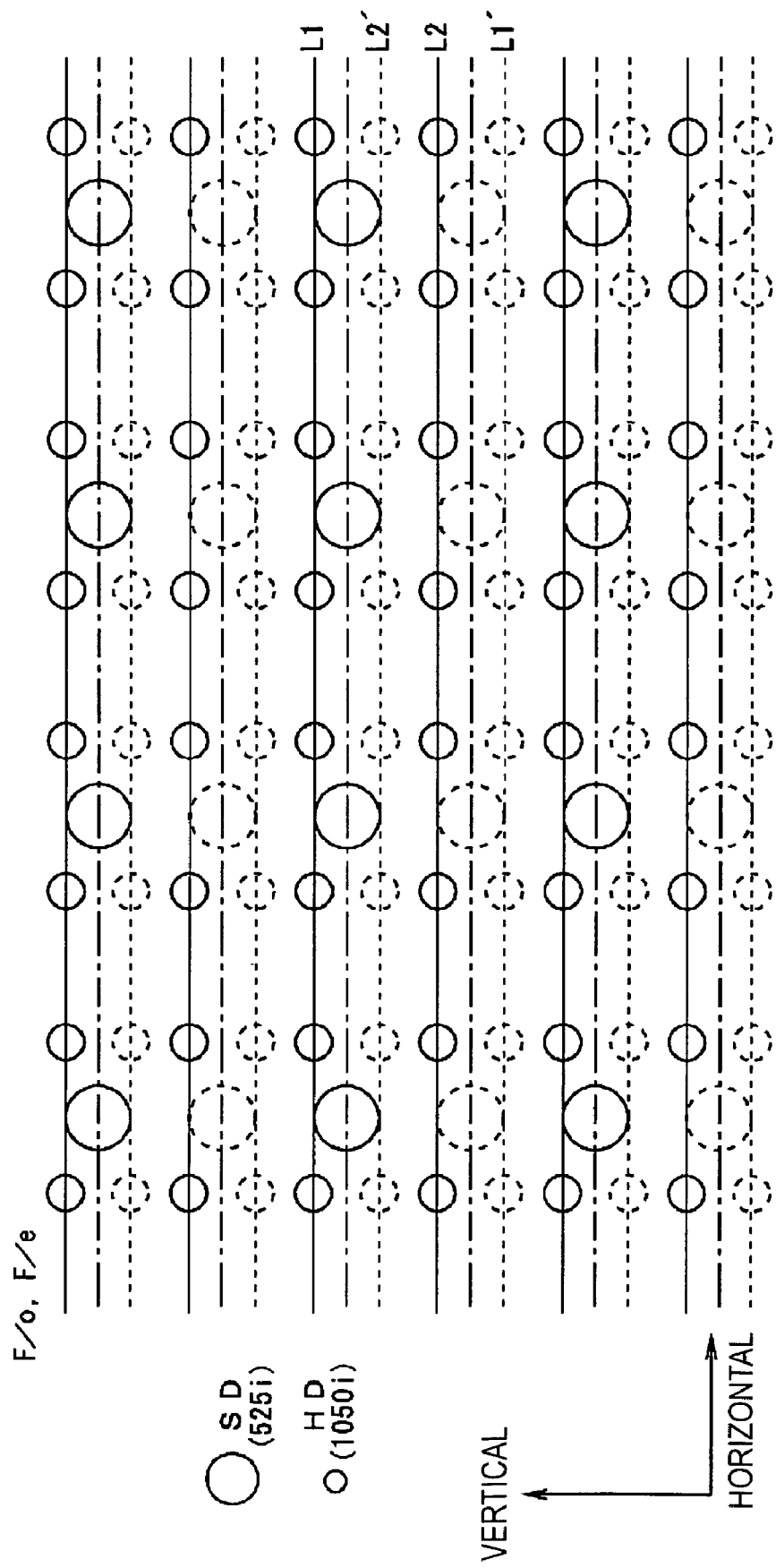
FIG. 2 is a diagram showing relationship of pixel positions between an SD signal (525i signal) and an HD signal (1050i signal)

FIG. 2 shows relationship of pixel positions in frames (F) of a 525i signal and a 1050i signal. Pixel positions in odd-numbered fields (o) are indicated by solid lines, and pixel positions in even-numbered fields (e) are indicated by broken lines. Large dots represent pixels of the 525i signal, and small dots represent pixels of the 1050i signal. As will be understood from FIG. 2, pixel data of the 1050i signal includes line data L1 and L1' at positions close to the lines of the 525i signal, and line data L2 and L2' at positions remote from the lines of the 525i signal.

L1 and L2 are line data of the odd-numbered fields, and L1' and L2' are line data of the even-numbered fields. The number of pixels on each line of the 1050i signal is twice the number of pixels on each line of the 525i signal.

Referring back to FIG. 1, the image-signal processing apparatus 100 includes an input terminal 101, a prediction-tap selecting circuit 102, and a class-tap selecting circuit 103. The input terminal 101 is used to input the image signal Va. The prediction-tap selecting circuit 102 and the class-tap selecting circuit 103, based on the image signal Va input to the input terminal 101, selectively extract a plurality of pieces of pixel data located at peripheral positions of a subject pixel position in the image signal Vb, as prediction-tap data and class-tap data, respectively.

Figure 3A:
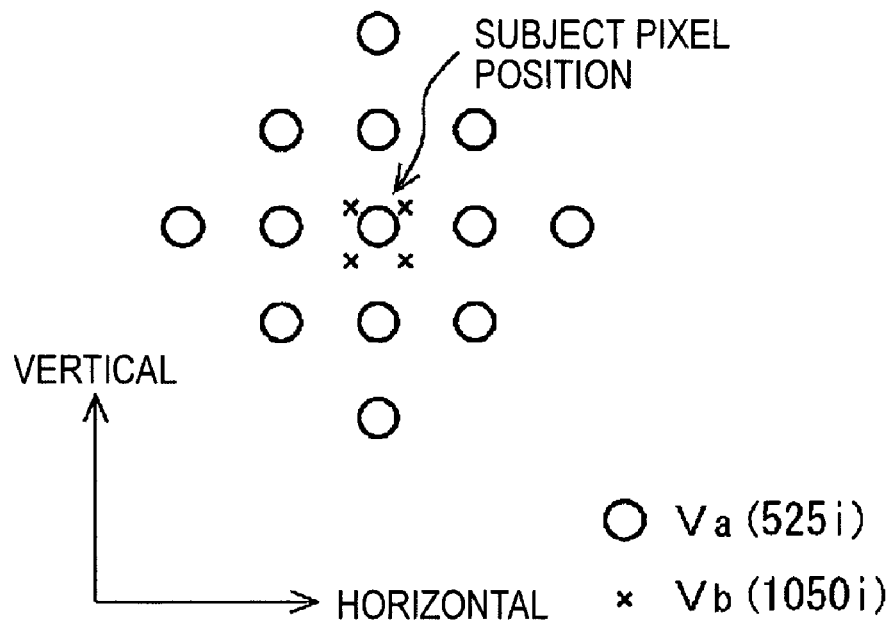
FIGS. 3A and 3B are diagrams showing example patterns of prediction taps and class taps.
Figure 3B:
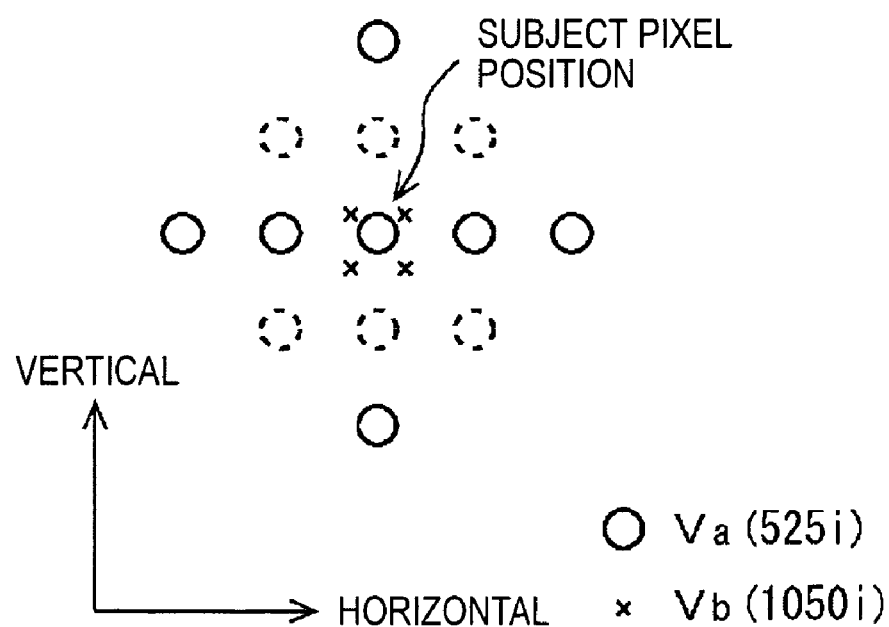

FIG. 3A shows an example pattern of a plurality of pieces of pixel data that is extracted as prediction-tap data. FIG. 3B shows an example pattern of a plurality of pieces of pixel data that is extracted as class-tap data (indicated by solid lines). Although a plurality of pieces of pixel data is extracted as prediction-tap data and class-tap data from a current field including a subject pixel position in the examples shown in FIGS. 3A and 3B, prediction-tap data and class-tap data may be further extracted from a predetermined number of fields temporally preceding and succeeding the current field.

The image-signal processing apparatus 100 further includes a class detecting circuit 104. The class detecting circuit 104 processes the plurality of pieces of pixel data selectively extracted by the class-tap selecting circuit 103 as class-tap data, generating a class code CL representing a class to which pixel data at the subject pixel position in the image signal Vb belongs.

More specifically, the class detecting circuit 104 first compresses the plurality of pieces of pixel data, for example, compresses each of the pieces of pixel data from 8-bit data to 2-bit data or 1-bit data. The data compression is performed, for example, by adaptive dynamic range coding (ADRC). Instead of ADRC, the data compression may be performed, for example, by differential pulse code modulation (DPCM) or vector quantization (VQ).

When ADRC is employed, letting a maximum value and a minimum value of the plurality of pieces of pixel data be denoted by MAX and MIN, a dynamic range of the plurality of pieces of pixel data by DR (=MAX−MIN+1), and the number of re-quantization bits by P, for each piece $k_i$ of the pieces of pixel data, a re-quantization code $q_i$ in the form of compressed data can be obtained according to equation (1) below. In equation (1), [ ] denotes truncation. When class-tap data includes Na pieces of pixel data, i=1 to Na.

$$q_i = [(k_i - MIN + 0.5) * 2^P / DR] \qquad (1)$$

Then, the class detecting circuit 104 generates a class code CL according to equation (2) below, using the re-quantization code $q_i$ obtained for each of the plurality of pieces of pixel data in the class-tap data.

$$CL = \sum_{i=1}^{Na} qi(2^P)^{i-1} \quad (2)$$

The image-signal processing apparatus 100 further includes a coefficient memory 105 as storage means. The coefficient memory 105 stores coefficient data Wi (i=1 to n) for each class, used in an estimating equation calculated by an estimate calculating circuit 106 described later. The coefficient data Wi is information that is used to convert the image signal Va (525i signal) into the image signal Vb (1050i signal).

As shown in FIG. 2, when converting a 525i signal into a 1050i signal, in each odd-numbered field or even-numbered field, four pixels of the 1050i signal are obtained for one pixel of the 525i signal. The four pixels in a 2×2 unit pixel block UB of the 1050i signal in each odd-numbered field or even-numbered field have different phase shifts with respect to a central prediction tap.

FIGS. 4A and 4B shows phase shifts of the four pixels in a 2×2 unit pixel block of the 1050i signal in an odd-numbered field and in an even-numbered field with respect to central prediction taps. In the case of the odd-numbered field, the positions of four pixels HD1 to HD4 in the unit pixel block UB are shifted from the position of a central prediction tap SD0 horizontally by k1 to k4 and vertically by m1 to m4, respectively. In the case of the even-numbered field, the positions of four pixels HD1' to HD4' in the unit pixel block UB are shifted from the position of a central prediction tap SD0' horizontally by k1' to k4' and vertically by m1' to m4', respectively.

Therefore, the coefficient data Wi for each class, described earlier, is composed of coefficient data Wi associated with each of the eight output pixels (HD1 to HD4 and HD1' to HD4'). Thus, the coefficient memory 105 stores coefficient data Wi for each combination of class and output pixel.

The coefficient data Wi is generated in advance by performing learning based on an image signal Vb' as a teacher signal corresponding to the image signal Vb and an image signal Va' as a student signal corresponding to the image signal Va. The teacher signal refers to a signal having a relatively high quality, while the student signal refers to a signal having a relatively low quality. The coefficient data Wi is generated based on learning data including only pixel data at feature positions in the image signal Vb', the pixel data at the feature positions having predetermined features that highly contribute to image quality. Thus, it is possible to accurately reproduce pixel data at the feature positions in the image signal Vb, the feature positions having the predetermined features that highly contribute to image quality. This serves to improve the image quality of an image composed of the image signal Vb. The method of generating the coefficient data Wi will be described later in detail.

The coefficient memory 105 receives the class code CL generated by the class detecting circuit 104 as read-address information. Coefficient data Wi associated with the class represented by the class code CL is read from the coefficient memory 105 and is supplied to the estimate calculating circuit 106.

The image-signal processing apparatus 100 further includes the estimate calculating circuit 106, a post-processing circuit 107, and an output terminal 108. The estimate calculating circuit 106 calculates pixel data y at the subject pixel position in the image signal Vb according to an estimating equation expressed in equation (3) below, using the plurality of pieces of pixel data xi selectively extracted by the prediction-tap selecting circuit 102 as prediction-tap data and the coefficient data Wi read from the coefficient memory 105.

$$y = \sum_{i=1}^{n} W_i \cdot xi \quad (3)$$

As described earlier, when converting a 525i signal into a 1050i signal, for each field, four pixels of the 1050i signal (HD1 to HD4 in FIG. 4A or HD1' to HD4' in FIG. 4B) are obtained for one pixel of the 525i signal (SD0 in FIG. 4A or SD0' in FIG. 4B). The estimate calculating circuit 106 calculates pixel data for each unit pixel block UB at a subject pixel position in the image signal Vb.

More specifically, the estimate calculating circuit 106 receives prediction-tap data xi associated with the four pixels (subject pixels) in a unit pixel block UB from the prediction-tap selecting circuit 102, and receives coefficient data Wi associated with the four pixels in the unit pixel block UB from the coefficient memory 105. Then, the estimate calculating circuit 106 individually calculates pixel data y1 to y4 of the four pixels of the unit pixel block UB according to the estimating equation expressed in equation (3) given above.

The post-processing circuit 107 converts the pixel data y1 to y4 of the four pixels of the unit pixel block UB, sequentially output from the estimate calculating circuit 106, into line-sequential data, and outputs the pixel data y1 to y4 in the format of the 1050i signal. The output terminal 108 is used to output the image signal Vb (1050i signal) output from the post-processing circuit 107.

Next, an operation of the image-signal processing apparatus 100 will be described.

When an SD image signal Va is input to the input terminal 101, pieces of pixel data constituting an image signal Vb is generated by a classification-adaptation process based on the image signal Va.

More specifically, the class-tap selecting circuit 103, based on the image signal Va, selectively extracts a plurality of pieces of pixel data located at peripheral positions of a subject pixel position in the image signal Vb, as class-tap data. The plurality of pieces of pixel data is supplied to the class detecting circuit 104. The class detecting circuit 104, for each piece ki of the plurality of pieces of pixel data as class-tap data, obtains a re-quantization code qi, for example, by performing ADRC, and generates a class code CL using the re-quantization code qi (refer to equations (1) and (2)).

The class code CL is supplied to the coefficient memory 105 as read-address information. From the coefficient memory 105, for each field, coefficient data Wi for four output pixels (HD1 to HD4 in FIG. 4A or HD1' to HD4' in FIG. 4B) associated with the class represented by the class code CL is read. The coefficient data Wi is supplied to the estimate calculating circuit 106.

Furthermore, the prediction-tap selecting circuit 102, based on the image signal Va, selectively extracts a plurality of pieces of pixel data xi located at peripheral positions of the subject pixel position in the image signal Vb, as prediction-tap data. The plurality of pieces of pixel data xi is supplied to the estimate calculating circuit 106.

The estimate calculating circuit 106 individually calculates pixel data y1 to y4 of the four pixels (subject pixels) of the unit pixel block UB at the subject pixel position in the image signal Vb according to the estimating equation expressed in equation (3), using the plurality of pieces of pixel data xi extracted by the prediction-tap selecting circuit 102 as prediction-tap data, and using the coefficient-data for the four output pixels, read from the coefficient memory 105.

The pixel data y1 to y4 of the four pixels of each unit pixel block constituting the image signal Vb, sequentially output from the estimate calculating circuit 106, is supplied to the post-processing circuit 107. The post-processing circuit 107 converts the pixel data y1 to y4 of the four pixels of the unit pixel block, sequentially supplied from the estimate calculating circuit 106, into line-sequential data, and outputs the pixel data y1 to y4 in the format of the 1050i signal. That is, the post-processing circuit 107 generates the image signal Vb (1050i signal), and the image signal Vb is output to the output terminal 108.

As described earlier, the coefficient data Wi (i=1 to n) stored in the coefficient memory 105 is generated using learning data including only pixel data at feature positions in the image signal Vb' as a teacher signal corresponding to the image signal Vb, the pixel data at the feature positions having predetermined features that highly contribute to image quality. Thus, with the image-signal processing apparatus 100 shown in FIG. 1, it is possible to accurately reproduce pixel data at the feature positions in the image signal Vb, the pixel data at the feature positions having the predetermined features that highly contribute to image quality. Accordingly, an image composed of the image signal Vb is improved.

Next, the method of generating the coefficient data Wi (i=1 to n) stored in the coefficient memory 105 of the image-signal processing apparatus 100 will be described. The coefficient data Wi is generated by performing learning.

First, the learning method will be described. In equation (3) given earlier, before learning is performed, the coefficient data W1, W2, . . . , Wn are undefined coefficients. Learning is performed using a plurality of pieces of learning data for each combination of class and output pixel. When the number of the pieces of learning data is m, equation (4) given below is set according to equation (3). n denotes the number of prediction taps.

$$yk = W1 \times xk1 + W2 \times xk2 + \ldots + Wn \times xkn (k=1,2,\ldots,m) \quad (4)$$

When m>n, the coefficient data W1, W2, . . . , Wn are not determined uniquely. Thus, the elements ek of an error vector e is defined by equation (5) below, and coefficient data that minimizes $e^2$ in equation (6) below is calculated. That is, coefficient data is uniquely determined by what is called the least square method.

$$ek = yk - \{W1 \times xk1 + W2 \times xk2 + \ldots + Wn \times xkn\} \quad (5)$$
$$(k = 1, 2, \ldots, m)$$

$$e^2 = \sum_{k=1}^{m} e_k^2 \quad (6)$$

As a practical method of calculating coefficient data that minimizes $e^2$ in equation (6), $e^2$ is partially differentiated with respect to the coefficient data Wi (i=1 to n) as expressed in equation (7), and coefficient data Wi is determined so that the value of partial differentiation becomes 0 for each value of i.

$$\frac{\partial e^2}{\partial W_i} = \sum_{k=1}^{m} 2\left(\frac{\partial e_k}{\partial W_i}\right) e_k = \sum_{k=1}^{m} 2 x_{ki} \cdot e_k \quad (7)$$

When Xji and Yi are defined as expressed in equations (8) and (9), equation (7) can be rewritten as a matrix expressed in equation (10). Equation (10) is a normal equation for calculating coefficient data Wi. Coefficient data Wi can be calculated by solving the normal equation by a general solving method, such as the sweep-out method (Gauss-Jordan elimination).

$$X_{ji} = \sum_{p=1}^{m} x_{pi} \cdot x_{pj} \quad (8)$$

$$Y_i = \sum_{k=1}^{m} x_{ki} \cdot y_k \quad (9)$$

$$\begin{pmatrix} X_{11} & X_{12} & \cdots & X_{1n} \\ X_{21} & X_{22} & \cdots & X_{2n} \\ \cdots & \cdots & \cdots & \cdots \\ X_{n1} & X_{n2} & \cdots & X_{nn} \end{pmatrix} \begin{pmatrix} W_1 \\ W_2 \\ \cdots \\ W_n \end{pmatrix} = \begin{pmatrix} Y_1 \\ Y_2 \\ \cdots \\ Y_n \end{pmatrix} \quad (10)$$

Next, a coefficient-data generating apparatus 150 for generating coefficient data Wi will be described with reference to FIG. 5. The coefficient-data generating apparatus 150 includes an input terminal 151 and an SD-signal generating circuit 152. The input terminal 151 is used to input an image signal Vb' as a teacher signal corresponding to the image signal Vb. The SD-signal generating circuit 152 generates an image signal Va' as a student signal corresponding to the image signal Va, by horizontally and vertically decimating the image signal Vb'.

The coefficient-data generating apparatus 150 further includes a prediction-tap selecting circuit 153 and a class-tap selecting circuit 154. The prediction-tap selecting circuit 153 and the class-tap selecting circuit 154, based on the image signal Va' generated by the SD-signal generating circuit 152, selectively extract a plurality of pieces of pixel data located at peripheral positions of a subject pixel position in the image signal Vb', as prediction-tap data and class-tap data, respectively. The prediction-tap selecting circuit 153 and the class-tap selecting circuit 154 correspond to the prediction-tap selecting circuit 102 and the class-tap selecting circuit 103 of the image-signal processing apparatus 100, respectively.

The coefficient-data generating apparatus 150 further includes a class detecting circuit 155. The class detecting circuit 155 processes the plurality of pieces of pixel data selectively extracted by the class-tap selecting circuit 154 as class-tap data, generating a class code CL representing a class to which pixel data at the subject pixel position in the image signal Vb' belongs. The class detecting circuit 155 corresponds to the class detecting circuit 104 of the image-signal processing apparatus 100.

The coefficient-data generating apparatus 150 further includes a teacher-tap selecting circuit 156. The teacher-tap selecting circuit 156, based on the image signal Vb', selectively extracts pixel data at the subject pixel position in the image signal Vb'.

The coefficient-data generating apparatus 150 further includes a feature-tap selecting circuit 157 and a feature-pixel determining unit 158. The feature-tap selecting circuit 157, based on the image signal Vb' input to the input terminal 151, selectively extracts pixel data at the subject pixel position and a plurality of pieces of pixel data located at peripheral positions of the subject pixel position in the image signal Vb', as feature-tap data.

Figure 6:
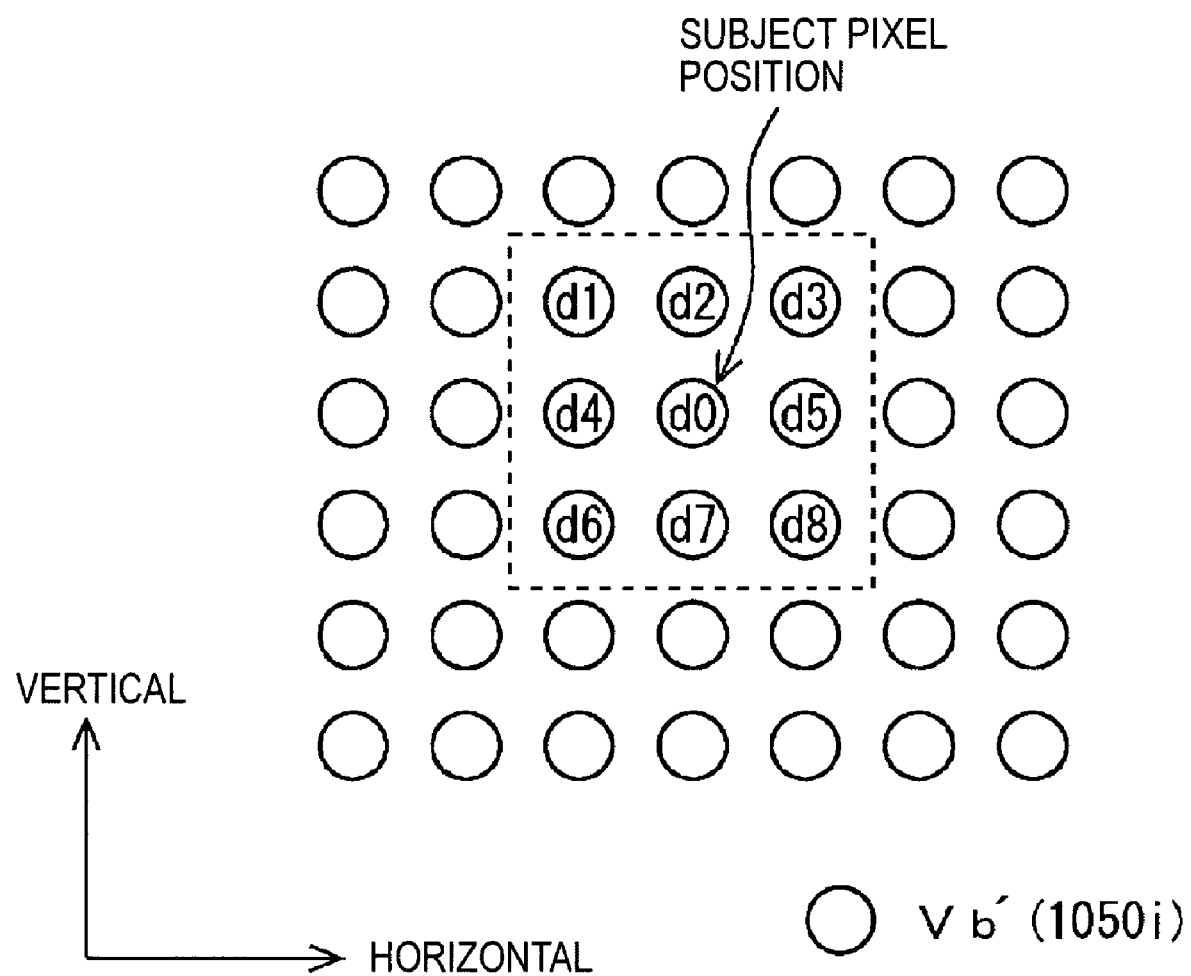
FIG. 6 is a diagram showing an example pattern of feature taps.

FIG. 6 shows an example pattern of a plurality of pieces of pixel data extracted as feature-tap data. In this example, the feature-tap data is composed of pixel data d0 at a subject pixel position and eight pieces of pixel data d1 to d8 located at peripheral positions of the subject pixel position. The pattern of feature taps is not limited to the pattern shown in FIG. 6. For the convenience of description, however, it is assumed herein that the pattern of feature taps selected by the feature-tap selecting circuit 157 is the pattern shown in FIG. 6.

The feature-pixel determining unit 158, based on the pieces of pixel data d0 to d8 selectively extracted by the feature-tap selecting circuit 157 as feature-tap data, determines whether the subject pixel position in the image signal Vb' is a feature position having a predetermined feature that highly contributes to image quality, outputting a determination signal JR indicating the result.

Figure 7:
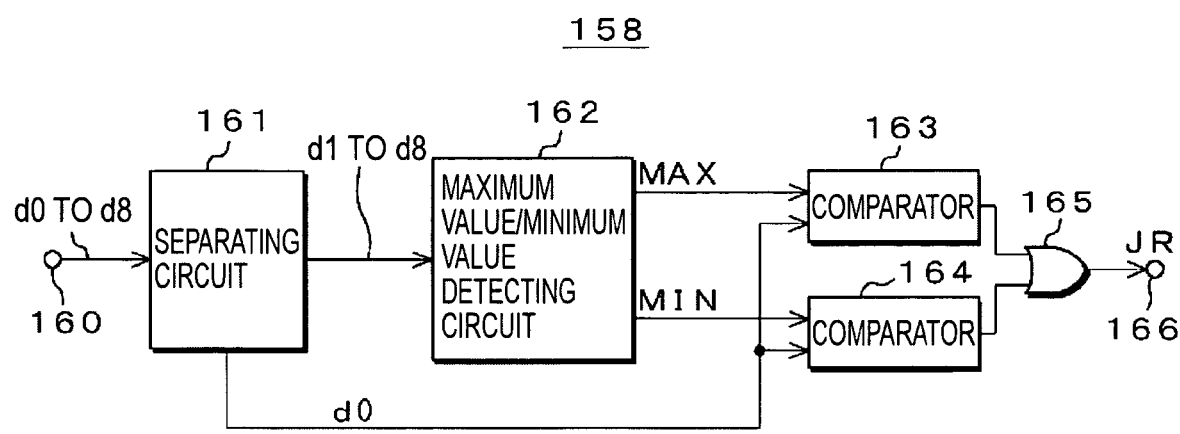
FIG. 7 is a block diagram showing a construction of a feature-pixel determining unit.

FIG. 7 shows an example construction of the feature-pixel determining unit 158. In this example, the subject pixel position is determined as a feature position when the pixel data d0 of the subject pixel position is greater than a maximum value MAX or less than a minimum value MIN of the pixel data d1 to d8 at the peripheral positions. The feature-pixel determining unit 158 includes an input terminal 160, a separating circuit 161, a maximum value/minimum value detecting circuit 162, comparators 163 and 164, an OR circuit 165, and an output terminal 166.

The input terminal 160 is used to input the pixel data d0 to d8 extracted by the feature-tap selecting circuit 157 as feature-tap data. The separating circuit 161 separates the pixel data d0 to d8 input to the input terminal 160 into the pixel data d0 at the subject pixel position and the eight pieces of pixel data d1 to d8 at the peripheral positions. The maximum value/minimum value detecting circuit 162 detects a maximum value MAX and a minimum value MIN from the pixel data d1 to d8 at the peripheral positions, separated by the separating circuit 161.

The comparator 163 compares the pixel data d0 at the subject pixel position, separated by the separating circuit 161, with the maximum value MAX detected by the maximum value/minimum value detecting circuit 162, outputting "1" when the pixel data d0 is greater than the maximum value MAX while otherwise outputting "0". The comparator 164 compares the pixel data d0 at the subject pixel position, separated by the separating circuit 161, with the minimum value MIN detected by the maximum value/minimum value detecting circuit 162, outputting "1" when the pixel data do is less than the minimum value MIN while otherwise outputting "0".

The OR circuit 165 receives the outputs of the comparators 163 and 164 as inputs, and outputs a logical sum of the outputs as a determination signal JR. The determination signal JR indicates that the subject pixel position is determined as a feature position when it is "1", while indicating that the subject pixel position is determined as not a feature position when it is "0". The output terminal 166 is used to output the determination signal JR output from the OR circuit 165.

Now, an operation of the feature-pixel determining unit 158 shown in FIG. 7 will be described. The pixel data d0 to d8 as feature-tap data, input to the input terminal 160, is supplied to the separating circuit 161. The separating circuit 161 separates the pixel data d0 to d8 into the pixel data d0 at the subject pixel position and the pixel data d1 to d8 at the peripheral positions.

The pixel data d1 to d8 at the peripheral positions, separated by the separating circuit 161, is supplied to the maximum value/minimum value detecting circuit 162. The maximum value/minimum value detecting circuit 162 detects a maximum value MAX and a minimum value MIN from the pixel data d1 to d8. The maximum value MAX and the minimum value MIN detected by the maximum value/minimum value detecting circuit 162 are supplied to the comparators 163 and 164, respectively. The comparators 163 and 164 also receive the pixel data d0 at the subject pixel position, separated by the separating circuit 161.

The comparator 163 compares the pixel data d0 with the maximum value MAX, outputting "1" when d0>MAX while otherwise outputting "0". The comparator 164 compares the pixel data d0 with the minimum value MIN, outputting "1" when d0<MIN while otherwise outputting "0". The OR circuit 165 takes the logical sum of the outputs of the comparators 163 and 164 to produce a determination signal JR, and the determination signal JR is output to the output terminal 166.

When the pixel data d0 at the subject pixel position is greater than the maximum value MAX or less than the minimum value MIN of the pixel data d1 to d8 at the peripheral positions, the output of the comparator 163 or the output of the comparator 164 becomes "1", so that the determination signal JR output from the OR circuit 165 becomes "1". Accordingly, the subject pixel position is determined as a feature position.

Referring back to FIG. 5, the coefficient-data generating apparatus 150 further includes a normal-equation generating circuit 171. The normal-equation generating circuit 171 generates a normal equation (refer to equation (10)) for obtaining coefficient data Wi for each class, based on the pixel data y of each subject pixel position in the image signal Vb', selectively extracted by the teacher-tap selecting circuit 156, the plurality of pieces of pixel data xi selectively extracted by the prediction-tap selecting circuit 153 as prediction-tap data associated with the pixel data y at each subject pixel position, and the class code CL generated by the class detecting circuit 155 for the pixel data y at each subject pixel position. The subject pixel position herein in the image signal Vb' is a subject pixel position determined as a feature position by the feature-pixel determining unit 158.

A single piece of learning data is generated based on a combination of a single piece of pixel data y and a plurality of pieces of pixel data xi associated therewith. A large number of pieces of learning data is generated for each class between the image signal Vb' as a teacher signal and the corresponding image signal Va' as a student signal. Thus, the normal-equation generating circuit 171 generates a normal equation for obtaining coefficient data Wi for each class, using learning data including only pixel data y at feature positions in the image signal Vb', the pixel data y at the feature positions having predetermined features that highly contribute to image quality.

Furthermore, the normal-equation generating circuit 171 generates a normal equation for each of the output pixels (HD1 to HD4 in FIG. 4A or HD1' to HD4' in FIG. 4B). More specifically, normal equations associated with HD1 to HD4 or HD1' to HD4' are generated using learning data including pixel data y having the same shifts as those of HD1 to HD4 or HD1' to HD4' with respect to the central prediction tap SD0 or SD0'. Thus, the normal-equation generating circuit 171 generates a normal equation for obtaining coefficient data Wi for each combination of class and output pixel.

The coefficient-data generating apparatus 150 further includes a coefficient-data determining circuit 172 and a coefficient memory 173. The coefficient-data determining circuit 172 receives data of normal equations from the normal-equation generating circuit 171, and solves the normal equations, for example, by the sweep-out method, to obtain coefficient data Wi for each combination of class and output pixel. The coefficient memory 173 stores the coefficient data Wi.

Now, an operation of the coefficient-data generating apparatus 150 shown in FIG. 5 will be described.

To the input terminal 151, an image signal vb' as a teacher signal is input. The SD-signal generating circuit 152 decimates the image signal Vb' horizontally and vertically to generate an image signal Va' as a student signal.

The class-tap selecting circuit 154, based on the image signal Va', selectively extracts a plurality of pieces of pixel data located at peripheral positions a subject pixel position in the image signal Vb', as class-tap data. The plurality of pieces of pixel data is supplied to the class detecting circuit 155. The class detecting circuit 155 compresses each of the pieces of pixel data, for example, by ADRC, and generates a class code CL representing a class to which pixel data of the subject pixel position in the image signal Vb' belongs (refer to equations (1) and (2). The class code CL is supplied to the normal-equation generating circuit 171.

The prediction-tap selecting circuit 153, based on the image signal Va', selectively extracts a plurality of pieces of pixel data xi located at the peripheral positions of the subject pixel position in the image signal Vb', as prediction-tap data. The plurality of pieces of pixel data xi is supplied to the normal-equation generating circuit 171. The teacher-tap selecting circuit 156, based on the image signal Vb', selectively extracts pixel data y of the subject pixel position in the image signal Vb'. The pixel data y is supplied to the normal-equation generating circuit 171.

The feature-tap selecting circuit 157, based on the image signal Vb', selectively extracts pixel data d0 at the subject pixel position and a plurality of pieces of pixel data d1 to d8 located at the peripheral positions in the image signal Vb', as feature-tap data. The pixel data d0 to d8 is supplied to the feature-pixel determining unit 158. The feature-pixel determining unit 158, based on the plurality of pieces of pixel data d0 to d8, determines whether the subject pixel position in the image signal Vb' is a feature position having a predetermined feature that highly contributes to image quality, producing a determination signal JR indicating the result.

For example, when the pixel data d0 at the subject pixel position is greater than the maximum value MAX or less than the minimum value MIN of the pixel data d1 to d8 at the peripheral positions, the subject pixel position is determined as a feature position. The determination signal JR is supplied to the normal-equation generating circuit 171.

The normal-equation generating circuit 171, for each subject pixel position in the image signal Vb' that is determined as a feature position by the feature-pixel determining unit 158, generates a normal equation (refer to equation (10)) for obtaining coefficient data Wi for each combination of class and output pixel (HD1 to HD4 in FIG. 4A or HD1' to HD4' in FIG. 4B), based on the pixel data y at the subject pixel position, the plurality of pieces of pixel data xi as prediction-tap data associated with the pixel data y of the subject pixel position, and the class code CL representing the class to which the pixel data y of the subject pixel position belongs.

The data of normal equations generated as described above is supplied to the coefficient-data determining circuit 172. The coefficient-data determining circuit 172 solves each of the normal equations to obtain coefficient data Wi for each combination of class and output pixel. The coefficient data Wi is stored in the coefficient memory 173.

Figure 5:
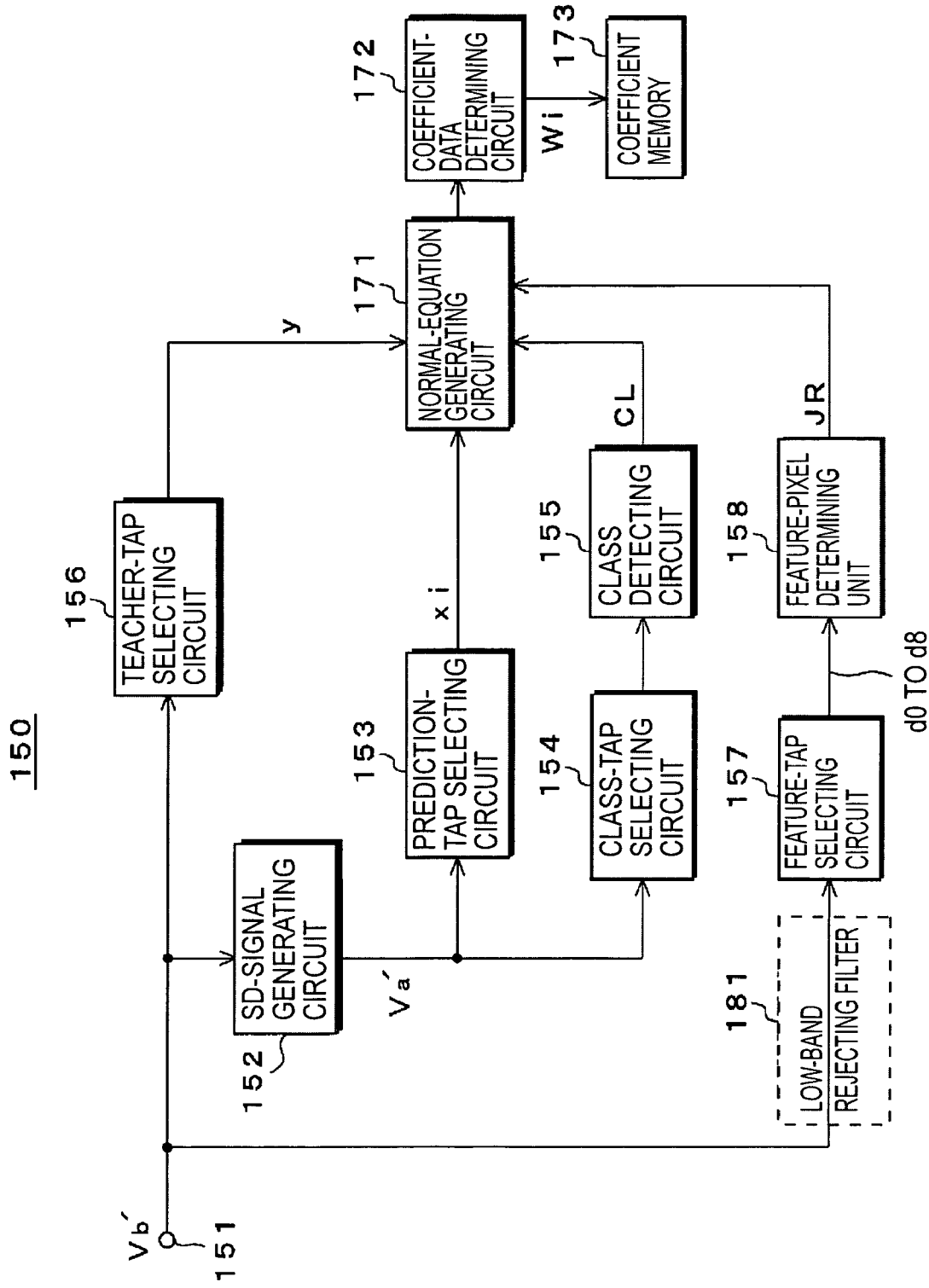
FIG. 5 is a block diagram showing the construction of a coefficient-data generating apparatus.

As described above, the coefficient-data generating apparatus 150 shown in FIG. 5 can generate coefficient data Wi for each combination of class and output pixel, which is to be stored in the coefficient memory 105 of the image-signal processing apparatus 100.

As described earlier, the coefficient data Wi is generated using learning data including only pixel data at feature positions in the image signal Vb' as a teacher signal, the pixel data at the feature positions having predetermined features that highly contribute to image quality. Thus, by storing the coefficient data Wi in the coefficient memory 105 of the image-signal processing apparatus 100 shown in FIG. 1, the image-signal processing apparatus 100 is allowed to accurately reproduce pixel data at the feature positions in the image signal Vb, the pixel data at the feature positions having the predetermined features that highly contribute to image quality. Accordingly, the image quality of an image composed of the image signal Vb is improved.

Although the construction shown in FIG. 7 has been described as an example of the feature-pixel determining unit 158 of the coefficient-data generating apparatus 150 shown in FIG. 5, without limitation thereto, other constructions are possible as long as it is possible to determine whether a subject pixel position is a feature position having a predetermined feature that highly contributes to image quality.

Figure 8:
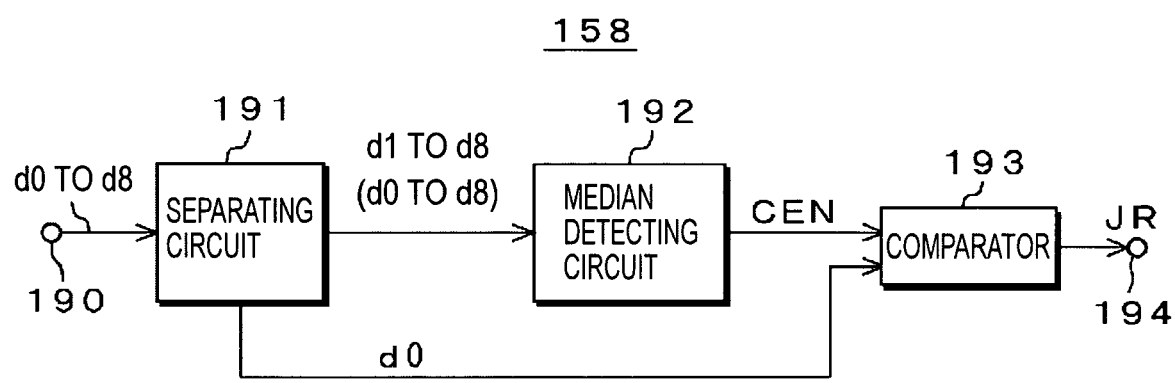
FIG. 8 is a block diagram showing another construction of a feature-pixel determining unit.

FIG. 8 shows another example construction of the feature-pixel determining unit 158. In this example, a subject pixel position is determined as a feature position when the pixel data d0 at the subject pixel position coincides with a median of the pixel data d1 to d8 at the peripheral positions or a median of the pixel data d0 at the subject pixel position and the pixel data d1 to d8 at the peripheral positions. In this example, the feature-pixel determining unit 158 includes an input terminal 190, a separating circuit 191, a median detecting circuit 192, a comparator 193, and an output terminal 194.

The input terminal 190 is used to input the pixel data d0 to d8 extracted by the feature-tap selecting circuit 157 as feature-tap data. The separating circuit 191 separates the pixel data d0 to d8 input to the input terminal 190 into the pixel data d0 at the subject pixel position and the eight pieces of pixel data d1 to d8 located at the peripheral positions or into the pixel data d0 and the pixel data d0 to d8.

The median detecting circuit 192 detects a median CEN from the pixel data d1 to d8 or the pixel data d0 to d8 separated by the separating circuit 191. The median of the pixel data d1 to d8 is an average of the fourth and fifth greatest pixel data. The median of the pixel data d0 to d8 is the fifth greatest pixel data.

The comparator 193 compares the pixel data d0 at the subject pixel position, separated by the separating circuit 191, with the median CEN detected by the median detecting circuit 192, outputting "1" when the pixel data d0 coincides with the median CEN while otherwise outputting "0". Coincidence herein refers to a case where the pixel data d0 at the subject pixel position exactly coincides with the median CEN, and also refers to a case where the pixel data d0 is in a predetermined range above and below the median CEN.

The output terminal 194 outputs the output of the comparator 193 as a determination signal JR. The determination signal JR indicates that the subject pixel position is determined as a feature position when it is "1", while indicating that the subject pixel position is determined as not a feature position when it is "0", similarly to the case of the feature-pixel determining unit 158 shown in FIG. 7.

Now, an operation of the feature-pixel determining unit 158 shown in FIG. 8 will be described. The pixel data d0 to d8 as feature-tap data, input to the input terminal 190, is supplied to the separating circuit 191. The separating circuit 191 separates the pixel data d0 to d8 into the pixel data d0 at the subject pixel position and the pixel data d1 to d8 at the peripheral positions or into the pixel data d0 and the pixel data d0 to d8.

The pixel data d1 to d8 at the peripheral positions or the pixel data d0 to d8, separated by the separating circuit 191, is supplied to the median detecting circuit 192. The median detecting circuit 192 detects a median CEN from the pixel data d1 to d8 or the pixel data d0 to d8. The median CEN detected by the median detecting circuit 192 is supplied to the comparator 193. The comparator 193 also receives the pixel data d0 at the subject pixel position, separated by the separating circuit 191.

The comparator 193 compares the pixel data d0 with the median CEN, outputting "1" when d0=CEN while otherwise outputting "0". The comparator 193 outputs a determination signal JR to the output terminal 194.

When the pixel data d0 at the subject pixel position coincides with the median CEN of the pixel data d1 to d8 at the peripheral positions or coincides with the median CEN of the pixel data d0 at the subject pixel position and the pixel data d1 to d8 at the peripheral positions, the output of the comparator 193 becomes "1" and the determination signal JR becomes "1". Accordingly, the subject pixel position is determined as a feature position.

Furthermore, in the coefficient-data generating apparatus 150 shown in FIG. 5, the feature-tap selecting circuit 157, based on the image signal Vb' input to the input terminal 151, selectively extracts pixel data d0 to d8 as feature-tap data. As indicated by a broken line in FIG. 5, a low-band rejecting filter 181 may be provided at a previous stage of the feature-tap selecting circuit 157 so that the pixel data d0 to d8 selectively extracted by the feature-tap selecting circuit 157 is supplied via the low-band rejecting filter 181.

In that case, the pixel data d0 to d8 includes only high-band components, so that the feature-pixel determining unit 158 determines whether a subject pixel position is a feature position based only on high-band components that particularly contribute to image quality. Thus, it is possible to effectively determine a feature position having a predetermined feature that highly contributes to image quality.

Figure 9:
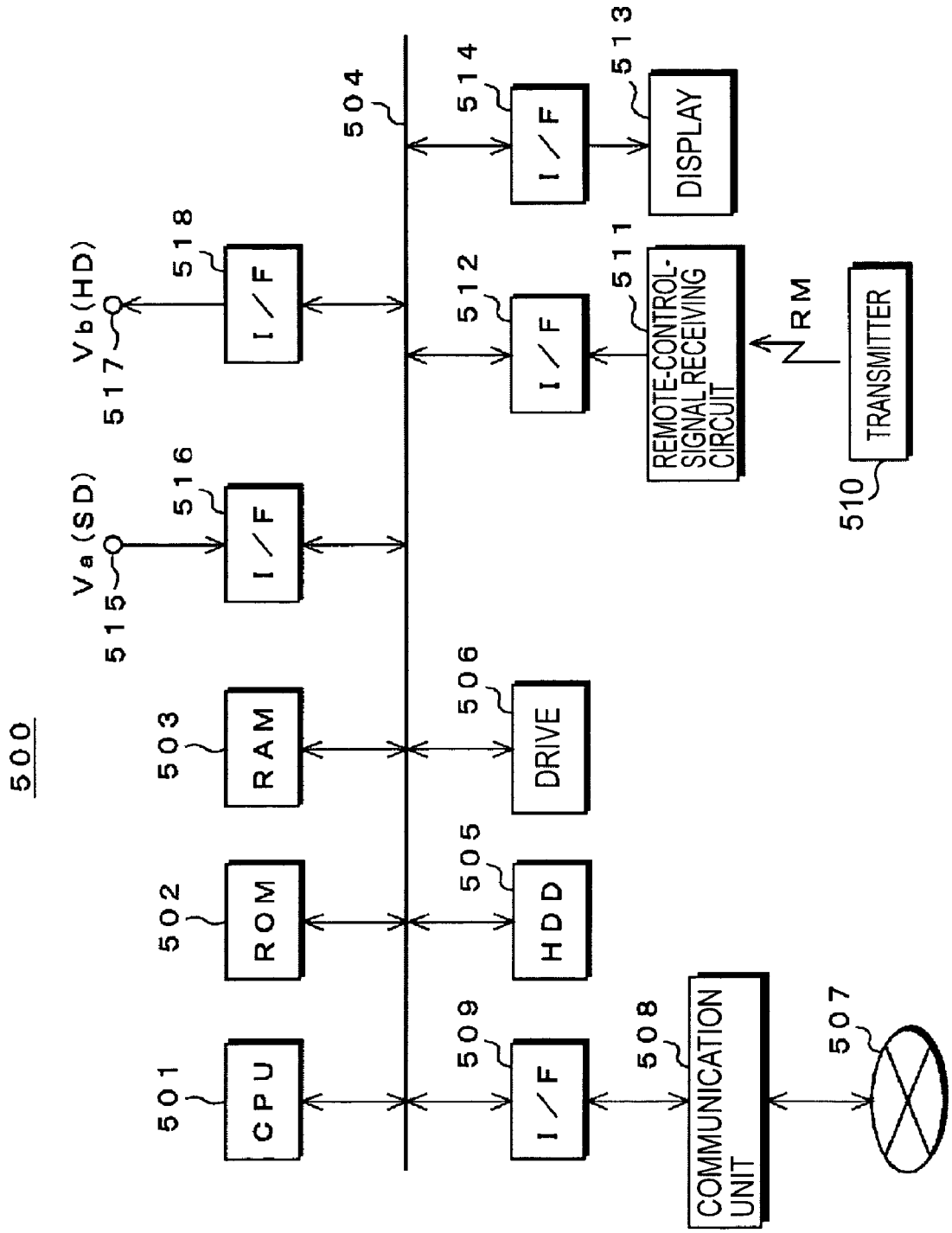
FIG. 9 is a block diagram showing the construction of an image-signal processing apparatus for software implementation.

The processing executed in the image-signal processing apparatus 100 shown in FIG. 1 may be implemented in software, for example, by an image-signal processing apparatus 500 shown in FIG. 9.

First, the image-signal processing apparatus 500 shown in FIG. 9 will be described. The image-signal processing apparatus 500 includes a central processing unit (CPU) 501 that controls the operation of the entire apparatus, a read-only memory (ROM) 502 that stores control programs of the CPU 501, coefficient data, or the like, and a random access memory (RAM) 503 that serves as a work area of the CPU 501. The CPU 501, the ROM 502, and the RAM 503 are connected to a bus 504.

The image-signal processing apparatus 500 further includes a hard disk drive (HDD) 505 as an external storage device, and a drive 506 for handling a removable storage medium, such as an optical disk, a magnetic disk, or a memory card. The HDD 505 and the drive 506 are connected to the bus 504.

The image-signal processing apparatus 500 further includes a communication unit 508 for connecting to a communication network 507, such as the Internet, by wire or by wireless. The communication unit 508 is connected to the bus 504 via an interface 509.

The image-signal processing apparatus 500 further includes a user interface unit. The user interface unit includes a remote-control-signal receiving circuit 511 that receives a remote-control signal RM from a remote-control transmitter 510, and a display 513 implemented by a liquid crystal display (LCD) or a plasma display panel (PDP). The receiving circuit 511 is connected to the bus 504 via an interface 512. Similarly, the display 513 is connected to the bus 504 via an interface 514.

Furthermore, the image-signal processing apparatus 500 has an input terminal 515 for inputting an SD image signal Va, and an output terminal 517 for outputting an HD image signal Vb. The input terminal 515 is connected to the bus 504 via an interface 516. Similarly, the output terminal 517 is connected to the bus 504 via an interface 518.

Instead of storing control programs, coefficient data, or the like in the ROM 502 in advance as described above, for example, the control programs, coefficient data, or the like may be downloaded from the communication network 507, such as the Internet, via the communication unit 508 and stored in the HDD 505 or the RAM 503. Yet alternatively, the control programs, coefficient data, or the like may be provided using a removable storage medium.

Furthermore, instead of inputting the image signal Va to be processed from the input terminal 515, the image signal Va may be recorded in advance in the HDD 505 or downloaded from the communication network 507, such as the Internet, via the communication unit 508. Furthermore, alternatively or in addition to outputting the image signal Vb after processing to the output terminal 517, the image signal Vb may be supplied to the display 513 to display an image, stored in the HDD 505, or transmitted to the communication network 507, such as the Internet, via the communication unit 508.

Now, a procedure of processing for obtaining an image signal Vb from an image signal Va in the image-signal processing apparatus 500 shown in FIG. 9 will be described with reference to a flowchart shown in FIG. 10.

In step ST10, the procedure starts. In step ST11, for example, an image signal Va of one frame or one field is input to the apparatus from the input terminal 515. The input image signal Va is temporarily stored in the RAM 503. When the image signal Va is recorded in advance in the HDD 505 in the apparatus, the image signal Va is read from the HDD 505 and is temporarily stored in the RAM 503.

Then, in step ST12, it is determined whether processing of all the frames or all the fields of the image signal Va has been finished. When the processing has been finished, in step ST13, the procedure is exited. On the other hand, when the processing has not been finished, the procedure proceeds to step ST14.

In step ST14, based on the image signal Va, a plurality of pieces of pixel data at peripheral positions of a subject pixel position in the image signal Vb is obtained as class-tap data. In step ST15, based on the class-tap data, a class code CL representing a class to which pixel data at the subject pixel position in the image signal Vb belongs is generated.

Then, in step ST16, based on the image signal Va, a plurality of pieces of pixel data xi at the peripheral positions of the subject pixel position in the image signal Vb is obtained as prediction-tap data. Then, in step ST17, pixel data y at the subject pixel position in the image signal Vb is generated according to the estimating equation expressed in equation (3), using coefficient data associated with the class code CL generated in step ST15 and the plurality of pieces of pixel data xi obtained in step ST16.

Then, in step ST18, it is determined whether processing for obtaining pixel data of the image signal Vb for the entire region of the pixel data of the image signal Va for one frame or one field, input in step ST11, has been finished. When the processing has been finished, the procedure returns to step ST11, entering processing for inputting an image signal Va for a next one frame or one field. On the other hand, when the processing has not been finished, the procedure returns to step ST14, entering processing for a next subject pixel position.

Figure 10:
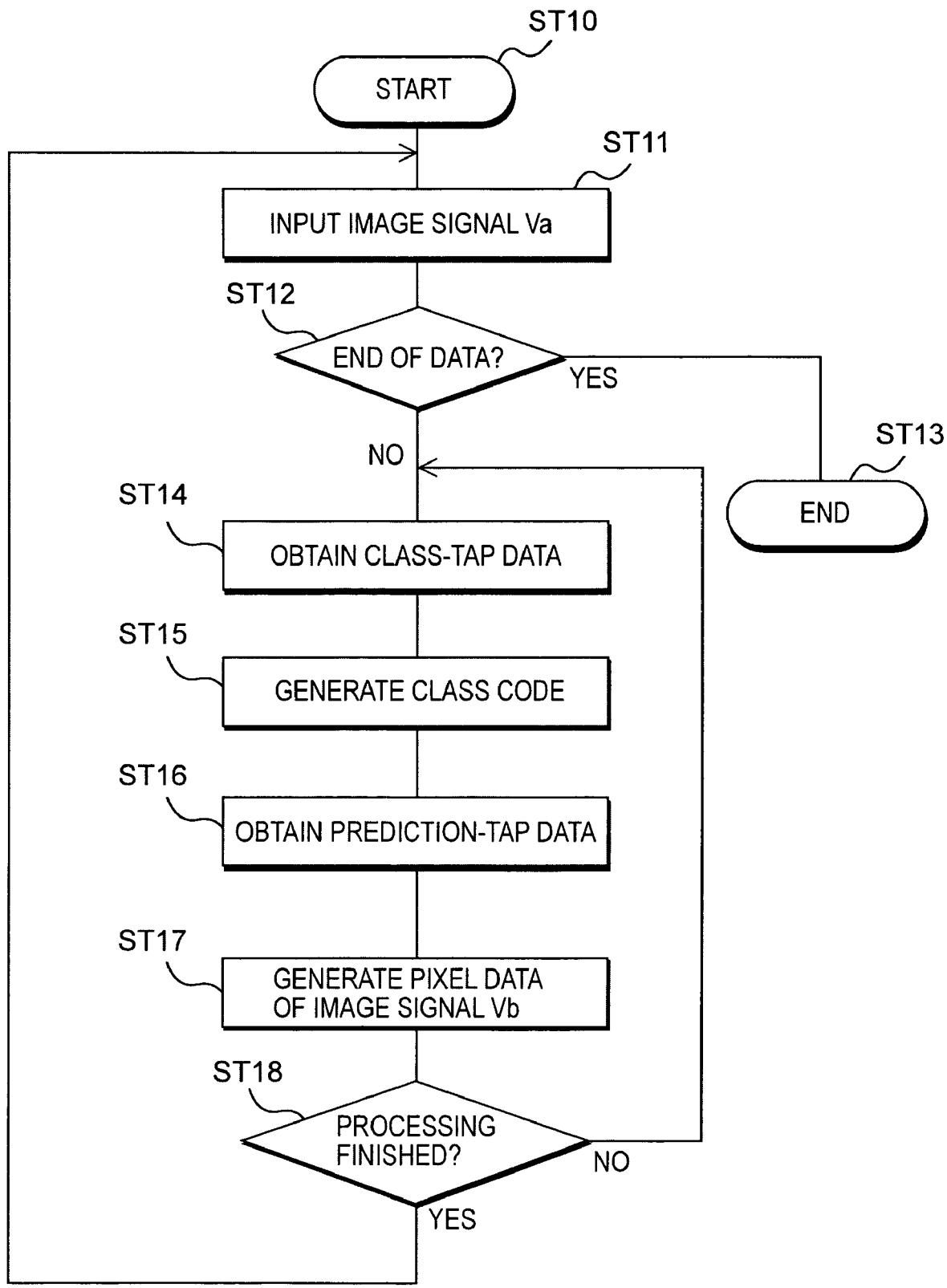
FIG. 10 is a flowchart showing a procedure of image signal processing.

As described above, by executing processing according to the flowchart shown in FIG. 10, pixel data of the image signal Vb can be obtained by processing pixel data of the input image signal Va. The image signal Vb is output to the output terminal 517, supplied to the display 513 to display a corresponding image, or supplied to and recorded on the HDD 505.

Furthermore, although a processing apparatus is not shown, processing in the coefficient-data generating apparatus 150 shown in FIG. 5 can also be implemented in software.

Now, a procedure of processing for generating coefficient data will be described with reference to a flowchart shown in FIG. 11.

In step ST20, the procedure starts. In step ST21, an image signal Vb' for one frame or one field is input as a teacher signal. Then, in step ST22, it is determined whether processing for all the frames or all the fields of the image signal Vb' has been finished. If the processing has not been finished, in step ST23, the image signal Vb' input in step ST21 is decimated horizontally and vertically, generating an image signal Va' as a student signal.

Then, in step ST24, based on the image signal Vb', pixel data d0 at a subject pixel position and pixel data d1 to d8 at peripheral positions are obtained as feature-tap data. Then, in step ST25, based on the pixel data d0 to d8 obtained in step ST24, it is determined whether the subject pixel position is a feature position having a predetermined feature that highly contributes to image quality. For example, the subject pixel position is determined as a feature position when the pixel data d0 at the subject pixel position is greater than a maximum value MAX or less than a minimum value MIN of the pixel data d1 to d8 at the peripheral positions.

When the subject pixel position is determined as a feature position, the procedure proceeds to step ST26. In step ST26, based on the image signal Va', a plurality of pieces of pixel data located at the peripheral positions of the subject pixel position in the image signal Vb' is obtained as class-tap data. In step ST27, based on the class-tap data, a class code CL representing a class to which the pixel data at the subject pixel position in the image signal Vb' belongs is generated.

Then, in step ST28, based on the image signal Va', a plurality of pieces of pixel data xi at the peripheral positions of the subject pixel position in the image signal Vb' is obtained as prediction-tap data. Furthermore, in step ST29, based on the image signal Vb', pixel data y at the subject pixel position in the image signal Vb' is obtained as teacher-tap data.

Then, in step ST30, using the class code CL generated in step ST27, the plurality of pieces of pixel data xi obtained in step ST28, and the pixel data y obtained in step ST29, summation is performed (refer to equations (8) and (9)) to yield a normal equation expressed in equation (10) for each combination of class and output pixel.

After step ST30, the procedure proceeds to step ST31. When it is determined in step ST25 that the subject pixel position is not a feature position, the procedure immediately proceeds to step ST31. Thus, in step ST30, normal equations are generated using learning data including only pixel data at feature positions in the image signal Vb' as a teacher signal, the pixel data at the feature positions having predetermined features that highly contribute to image quality.

In step ST31, it is determined whether learning has been finished for the entire region of the pixel data of the image signal Vb' for one frame or one field, input in step ST21. When the learning has been finished, the procedure returns to step ST21, an image signal Vb' for a next one frame or one field is input, and the procedure described above is repeated. On the other hand, when the learning has not been finished, the procedure returns to step ST24, entering processing for a next subject pixel position.

When it is determined in step ST22 that the processing has been finished, in step ST32, the normal equations generated by summation in step ST30 are solved to obtain coefficient data Wi for each combination of class and output pixel. Then, in step ST33, the coefficient data Wi is stored in a coefficient memory. Then, the procedure is exited in step ST34.

Figure 11:
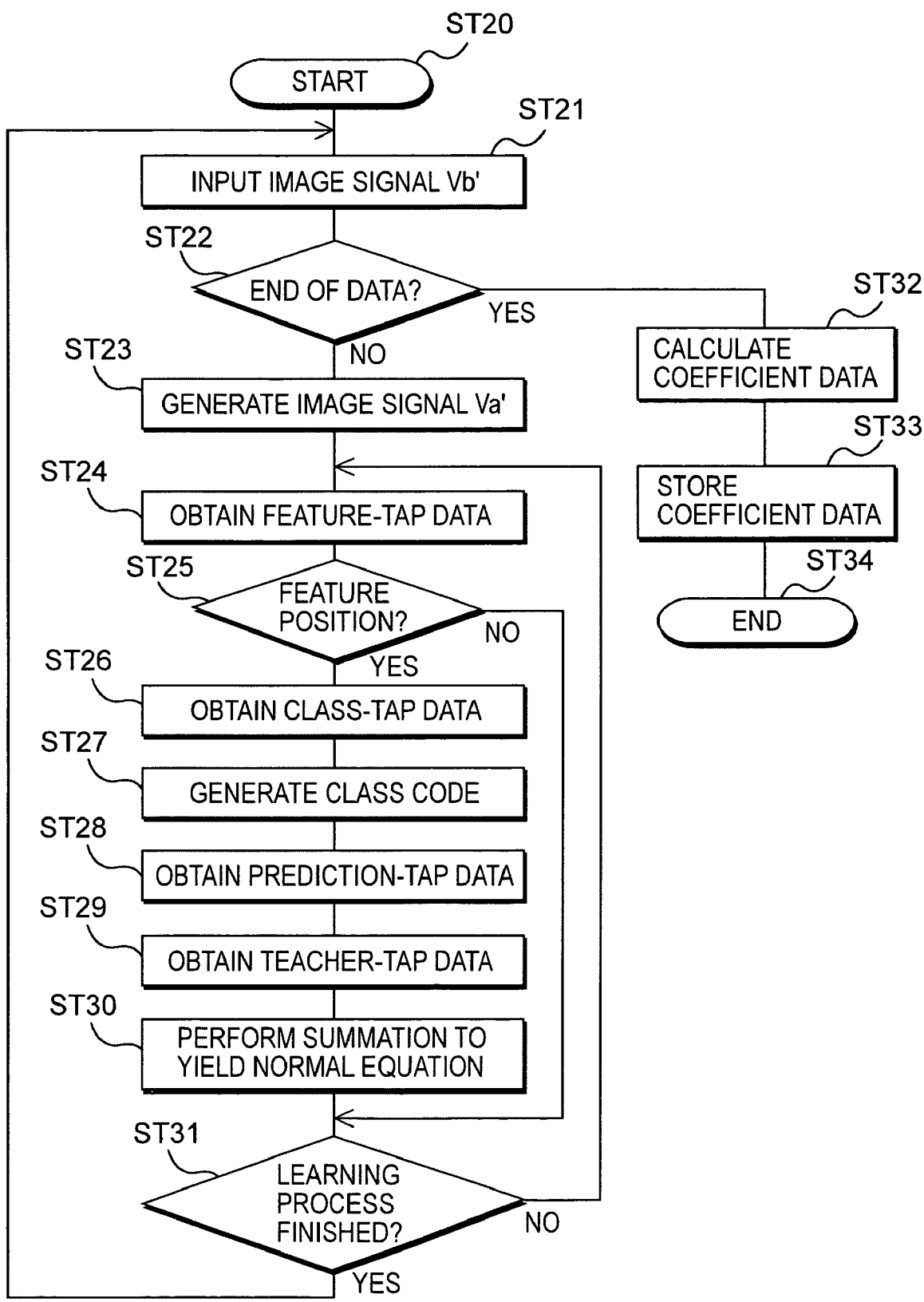
FIG. 11 is a flowchart showing a procedure of generating coefficient data.

As described above, by executing processing according to the flowchart shown in FIG. 11, coefficient data Wi can be generated by a method similar to the method used in the coefficient-data generating apparatus 150 shown in FIG. 5.

Figure 12:
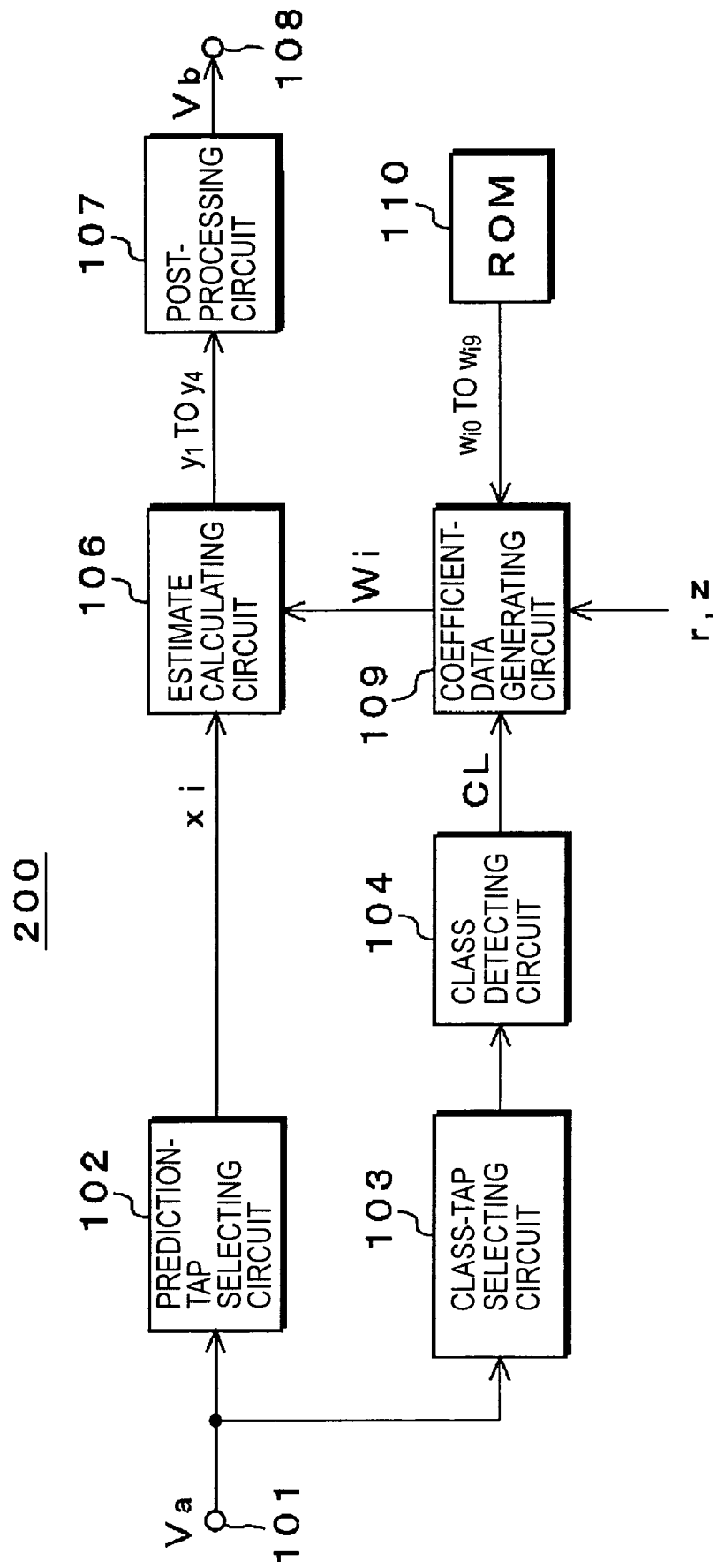
FIG. 12 is a block diagram showing the construction of an image-signal processing apparatus according to a second embodiment of the present invention.

Next, a second embodiment of the present invention will be described. FIG. 12 shows the construction of an image-signal processing apparatus 200 according to the second embodiment. The image-signal processing apparatus 200 also converts an SD image signal Va referred to as a 525i signal into an HD image signal Vb referred to as a 1050i signal. The image signal Va constitutes a first information signal, and the image signal Vb constitutes a second information signal. In FIG. 12, parts corresponding to those in FIG. 1 are designated by the same numerals, and descriptions thereof will be omitted as appropriate.

The image-signal processing apparatus 200 includes an input terminal 101, a prediction-tap selecting circuit 102, and a class-tap selecting circuit 103. The input terminal 101 is used to input the image signal Va. The prediction-tap selecting circuit 102 and the class-tap selecting circuit 103, based on the image signal Va input to the input terminal 101, selectively extract a plurality of pieces of pixel data at peripheral positions of a subject pixel position in the image signal Vb, as prediction-tap data and class-tap data, respectively. The input terminal 101, the prediction-tap selecting circuit 102, and the class-tap selecting circuit 103 correspond to those in the image-signal processing apparatus 100 shown in FIG. 1.

The image-signal processing apparatus 200 further includes a class detecting circuit 104. The class detecting circuit 104 processes the plurality of pieces of pixel data selectively extracted by the class-tap selecting circuit 103 as class-tap data, generating a class code CL representing a class to which pixel data at the subject pixel position in the image signal Vb belongs. The class detecting circuit 104 corresponds to that in the image-signal processing apparatus 100 shown in FIG. 1.

The image-signal processing apparatus 200 further includes a coefficient-data generating circuit 109 and a ROM 110 as storage means. The ROM 110 stores coefficient-seed data for each class. The coefficient-seed data is coefficient data for a generating equation for generating coefficient data Wi (i=1 to n) according to the estimating equation expressed in equation (3), the generating equation including parameters r and z. Equation (11) is an example of the generating equation, where wi0 to wi9 denote coefficient-seed data. The parameter r defines the resolution, and the parameter z defines the degree of the effect of removing noise. The coefficient-seed data wi0 to wi9 is information that is used to convert the image signal Va (525i signal) into the image signal Vb (1050i signal).

$$W_i = w_{i0} + w_{i1}r + w_{i2}z + w_{i3}r^2 + w_{i4}rz + w_{i5}z^2 + w_{i6}r^3 + w_{i7}r^2z + w_{i8}rz^2 + w_{i9}z^3 \quad (11)$$

As described earlier with reference to FIG. 2, when converting a 525i signal into a 1050i signal, in each odd-numbered field or even-numbered field, four pixels of the 1050i signal are obtained for one pixel of the 525i signal. The four pixels of a 2×2 unit pixel block UB constituting the 1050i signal in each odd-numbered field or even-numbered field have different phase shifts with respect to a central prediction tap (refer to FIG. 4A or 4B). Thus, the coefficient-seed data wi0 to wi9 for each class includes coefficient data associated with eight output pixels (HD1 to HD4 and HD1' to HD4'). Thus, the ROM 110 stores coefficient-seed data wi0 to wi9 for each combination of class and output pixel.

The coefficient-seed data wi0 to wi9 is generated in advance by performing learning based on the image signal Vb' as a teacher signal corresponding to the image signal Vb and the image signal Va' as a student signal corresponding to the image signal Va. The coefficient-seed data wi0 to wi9 is generated using learning data including only pixel data at feature positions in the image signal Vb', the pixel data at the feature positions having predetermined features that highly contribute to image quality. Thus, it is possible to accurately reproduce pixel data at the feature positions in the image signal Vb, the pixel data at the feature positions having the predetermined features that highly contribute to image quality. This serves to improve the image quality of an image composed of the image signal Vb. The method of generating the coefficient-seed data wi0 to wi9 will be described later in detail.

The coefficient-data generating circuit 109, for each odd-numbered field or even-numbered field, obtains from the ROM 110 coefficient-seed data wi0 to wi9 for four pixels corresponding to the four output pixels (HD1 to HD4 in FIG. 4A or HD1' to HD4' in FIG. 4B) of the class represented by the class code CL obtained by the class detecting circuit 104, and generates coefficient data Wi for the four pixels according to the generating equation expressed in equation (11) using the values of the parameters r and z adjusted by a user.

The image-signal processing apparatus 200 further includes an estimate calculating circuit 106. The estimate calculating circuit 106 calculates pixel data for each unit pixel block UB located at a subject pixel position in the image signal Vb. More specifically, the estimate calculating circuit 106, using prediction-tap data xi associated with four pixels (subject pixels) in a unit pixel block UB, extracted by the prediction-tap selecting circuit 102, and coefficient data Wi for four pixels corresponding to the four pixels in the unit pixel block UB, generated by the coefficient-data generating circuit 109, individually calculates pixel data y1 to y4 of the four pixels of the unit pixel block UB according to the estimating equation expressed in equation (3). The estimate calculating circuit 106 corresponds to that in the image-signal processing apparatus 100 shown in FIG. 1.

The image-signal processing apparatus 200 further includes a post-processing circuit 107 and an output terminal 108. The post-processing circuit 107 converts the pixel data y1 to y4 of the four pixels of the unit pixel block UB, sequentially output from the estimate calculating circuit 106, into line-sequential data, and outputs the pixel data y1 to y4 in the format of the 1050i signal. The output terminal 108 is used to output the image signal Vb (1050i signal) output from the post-processing circuit 107. The post-processing circuit 107 and the output terminal 108 correspond to those in the image-signal processing apparatus 100 shown in FIG. 1.

Next, an operation of the image-signal processing apparatus 200 shown in FIG. 12 will be described.

When an SD image signal Va is input to the input terminal 101, based on the image signal Va, pieces of pixel data constituting an image signal Vb are generated by a classification and adaptation process.

More specifically, the class-tap selecting circuit 103, based on the image signal Va, selectively extracts a plurality of pieces of pixel data located at peripheral positions of a subject pixel position in the image signal Vb, as class-tap data. The plurality of pieces of pixel data is supplied to the class detecting circuit 104. The class detecting circuit 104, for each piece ki of the plurality of pieces of pixel data as class-tap data, obtains a re-quantization code qi, for example, by ADRC, and generates a class code CL using the re-quantization code qi (refer to equations (1) and (2)). The class code CL is supplied to the coefficient-data generating circuit 109.

The coefficient-data generating circuit 109, for each odd-numbered field or even-numbered field, obtains from the ROM 110 coefficient-seed data wi0 to wi9 for four pixels corresponding to the four output pixels (HD1 to HD4 in FIG. 4A or HD1' to HD4' in FIG. 4B) of the class represented by the class code CL. The coefficient-data generating circuit 109 also receives the values of the parameters r and z adjusted by the user. The coefficient-data generating circuit 109, for each field, generates coefficient data Wi for the four output pixels according to the generating equation expressed in equation (11) using the coefficient-seed data wi0 to wi9 for the four pixels and the values of the parameters r and z. The coefficient data Wi is supplied to the estimate calculating circuit 106.

Furthermore, the prediction-tap selecting circuit 102, based on the image signal Va, selectively extracts a plurality of pieces of pixel data located at the peripheral positions of the subject pixel position in the image signal Vb, as prediction-tap data. The plurality of pieces of pixel data xi is supplied to the estimate calculating circuit 106.

The estimate calculating circuit 106, based on the plurality of pieces of pixel data xi extracted by the prediction-tap selecting circuit 102 as prediction-tap data, and the coefficient data Wi for the four pixels, generated by the coefficient-data generating circuit 109, individually calculates pixel data y1 to y4 of the four pixels (subject pixels) in a unit pixel block UB at the subject pixel position in the image signal Vb, according to the estimating equation expressed in equation (3).

The pixel data y1 to y4 of the four pixels of each unit pixel block constituting the image signal Vb, sequentially output from the estimate calculating circuit 106, is supplied to the post-processing circuit 107. The post-processing circuit 107 converts the pixel data y1 to y4 of the four pixels of the unit pixel block, sequentially supplied from the estimate calculating circuit 106, into line-sequential data, and outputs the pixel data y1 to y4 in the format of the 1050i signal. That is, the post-processing circuit 107 generates the image signal Vb (1050i signal), and the image signal Vb is output to the output terminal 108.

As described above, the coefficient-seed data wi0 to wi9 (i=1 to n) stored in the ROM 110 is generated using learning data including only pixel data at feature positions in the image signal Vb' as a teacher signal corresponding to the image signal Vb, the pixel data at the feature positions having predetermined features that highly contribute to image quality. Thus, with the image-signal processing apparatus 200 shown in FIG. 12, it is possible to accurately reproduce pixel data at the feature positions in the image signal Vb, the pixel data at the feature positions having the predetermined features that highly contribute to image quality. This serves to improve the image quality of an image composed of the image signal Vb.

Next, a method of generating coefficient-seed data that is stored in the ROM 110 of the image-signal processing apparatus 200 will be described. The coefficient-seed data is generated by performing learning. In an example described below, coefficient-seed data wi0 to wi9 (i=1 to n) that is used in the generating equation expressed in equation (11) is obtained.

For the following description, tj (j=0 to 9) are defined as in equation (12).

$$t0=1, t1=r, t2=z, t3=r2, t4=rz, t5=z2, t6=r3, t7=r2z, t8=rz2, t9=z3 \quad (12)$$

Using equation (12), equation (11) can be rewritten as equation (13).

$$W_i = \sum_{j=0}^{9} W_{ij} t_j \quad (13)$$

Consequently, undefined coefficients wij are obtained by performing learning. More specifically, for each combination of class and output pixel, coefficients that minimize square error is determined using a plurality of pieces of learning data, i.e., by what is called the least square method. Letting the number of pieces of learning data be denoted by m, an error in a k-th ($1 \leq k \leq m$) piece of learning data by ek, and the sum of square errors by E, E can be expressed by equation (14) using equations (3) and (11). xik denotes k-th piece of pixel data at an i-th prediction-tap position of an SD signal, and yk denotes a corresponding k-th piece of pixel data of an HD signal.

$$E = \sum_{k=1}^{m} e_k^2 \quad (14)$$

$$= \sum_{k=1}^{m} [y_k - (W_1 x_{1K} + W_2 x_{2K} + \ldots + W_n x_{nK})]^2$$

$$= \sum_{k=1}^{m} \{y_k - [(t_0 w_{10} + t_1 w_{11} + \ldots + t_9 w_{19}) x_{1k} + \ldots +$$

$$(t_0 w_{n0} + t_1 w_{n1} + \ldots + t_9 w_{n9}) x_{nk}]\}^2$$

$$= \sum_{k=1}^{m} \{y_k - [(w_{10} + w_{11} r + \ldots + w_{19} z^3) x_{1k} + \ldots +$$

$$(w_{n0} + w_{n1} r + \ldots + w_{n9} z^3) x_{nk}]\}^2$$

According to the least square method, wij with which partial differentiation of equation (14) with respect to wij becomes 0 is obtained. This can be expressed by equation (15).

$$\frac{\partial E}{\partial w_{ij}} = \sum_{k=1}^{m} 2\left(\frac{\partial e_k}{\partial w_{ij}}\right) e_k = -\sum_{k=1}^{m} 2 t_j x_{ik} e_k = 0 \quad (15)$$

Letting Xipjq and Yip be defined as in equations (16) and (17), equation (15) can be rewritten as equation (18) using a matrix.

$$X_{ipjq} = \sum_{k=1}^{m} x_{ik} t_p x_{jk} t_q \quad (16)$$

$$Y_{ip} = \sum_{k=1}^{m} x_{ik} t_p y_k \quad (17)$$

$$\begin{bmatrix} X_{1010} & X_{1011} & X_{1012} & \cdots & X_{1019} & X_{1020} & \cdots & X_{10n9} \\ X_{1110} & X_{1111} & X_{1112} & \cdots & X_{1119} & X_{1120} & \cdots & X_{11n9} \\ X_{1210} & X_{1211} & X_{1212} & \cdots & X_{1219} & X_{1220} & \cdots & X_{12n9} \\ \vdots & \vdots & \vdots & \ddots & \vdots & \vdots & \ddots & \vdots \\ X_{1910} & X_{1911} & X_{1912} & \cdots & X_{1919} & X_{1920} & \cdots & X_{19n9} \\ X_{2010} & X_{2011} & X_{2012} & \cdots & X_{2019} & X_{2020} & \cdots & X_{20n9} \\ \vdots & \vdots & \vdots & \ddots & \vdots & \vdots & \ddots & \vdots \\ X_{n910} & X_{n911} & X_{n912} & \cdots & X_{n919} & X_{n920} & \cdots & X_{n9n9} \end{bmatrix} \begin{bmatrix} w_{10} \\ w_{11} \\ w_{12} \\ \vdots \\ w_{19} \\ w_{20} \\ \vdots \\ w_{n9} \end{bmatrix} = \begin{bmatrix} Y_{10} \\ Y_{11} \\ Y_{12} \\ \vdots \\ Y_{19} \\ Y_{20} \\ \vdots \\ Y_{n9} \end{bmatrix} \quad (18)$$

Equation (18) is a normal equation for calculating coefficient-seed data wi0 to wi9. The coefficient-seed data wi0 to wi9 can be calculated by solving the normal equation by a general solving method, such as the sweep-out method (Gauss-Jordan elimination).

Figure 13:
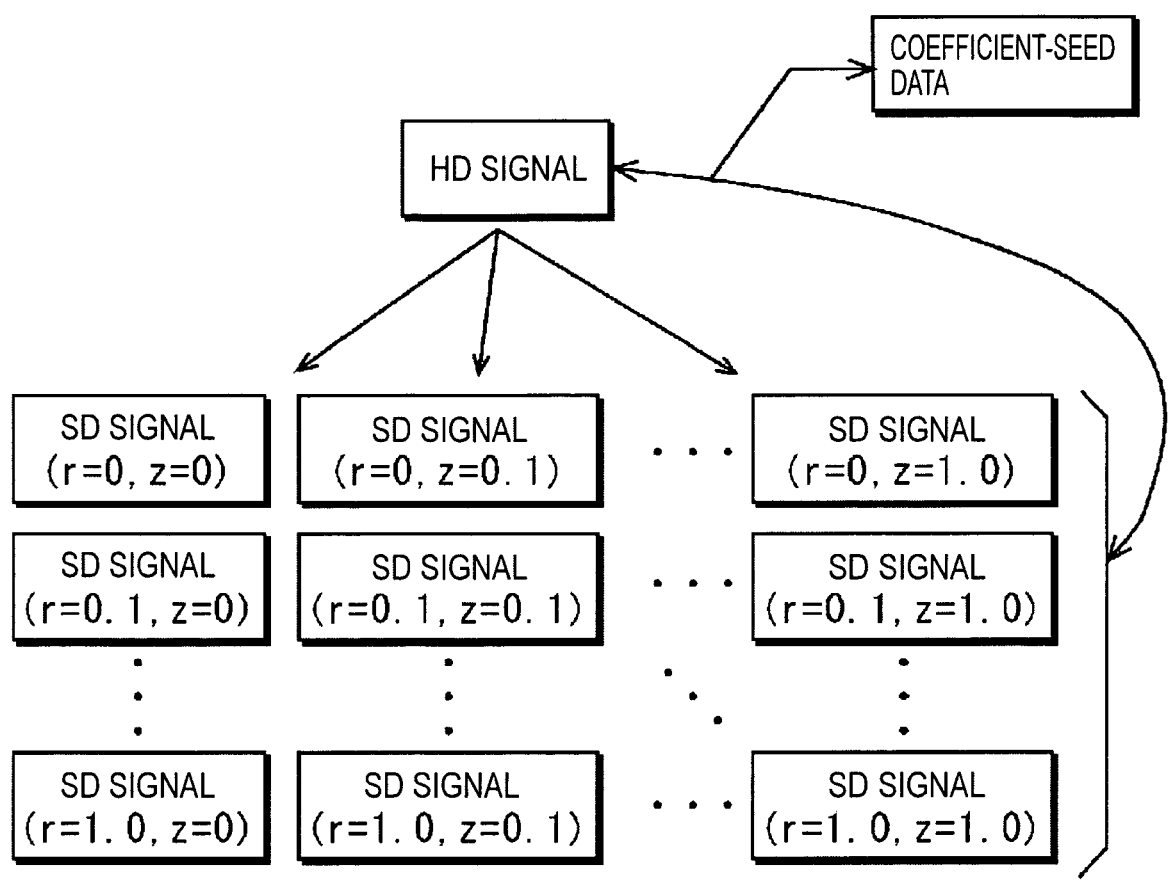
FIG. 13 is a diagram for explaining a method of generating coefficient-seed data.

FIG. 13 shows the scheme of the method of generating coefficient-seed data described above. From an HD signal as a teacher signal, a plurality of SD signals as student signals is generated. By varying frequency characteristics of decimation filters that are used when generating SD signals from an HD signal, SD signals of different resolutions can be generated.

By using the SD signals having different resolutions, it is possible to generate coefficient-seed data having different effects of increasing resolution. For example, when an SD signal with which an image with much blur is obtained and an SD signal with which an image with little blur is obtained exist, coefficient-seed data having a strong effect of increasing resolution can be obtained by performing learning based on the SD signal with which an image with much blur is obtained, and coefficient-seed data having a weak effect of increasing resolution can be obtained by performing learning based on the SD signal with which an image with little blur is obtained.

Furthermore, by adding noise to the SD signals having different resolutions, SD signals with noise superposed thereon are generated. By varying the amount of noise added, SD signals having different amounts of noise can be generated, so that coefficient-seed data having different effects of removing noise can be generated. For example, when an SD signal with a large amount of noise added thereto and an SD signal with a small amount of noise added thereto exist, coefficient-seed data having a strong effect of removing noise can be generated by performing learning based on the SD signal with a large amount of noise added thereto, and coefficient-seed data having a weak effect of removing noise can be generated by performing learning based on the SD signal with a small amount of noise added thereto.

When a noise n is added to a pixel value x of an SD signal to generate a pixel value x' of an SD signal with a noise added thereto, the amount of noise added can be adjusted, for example, by changing G as expressed in equation (19).

$$x' = x + G \cdot n \quad (19)$$

For example, the value of the parameter r for changing frequency characteristics is varied in 11 levels from 0 to 1.0 by a step size of 0.1, and the value of the parameter z for changing the amount of noise added is varied in 11 levels from 0 to 1.0 by a step size of 0.1, generating 121 SD signals in total. Coefficient-seed data is generated by performing learning between the SD signals generated as described above and HD signals. The parameters r and z correspond to the parameters r and z supplied to the coefficient-data generating circuit 109 shown in FIG. 12.

Figure 14:
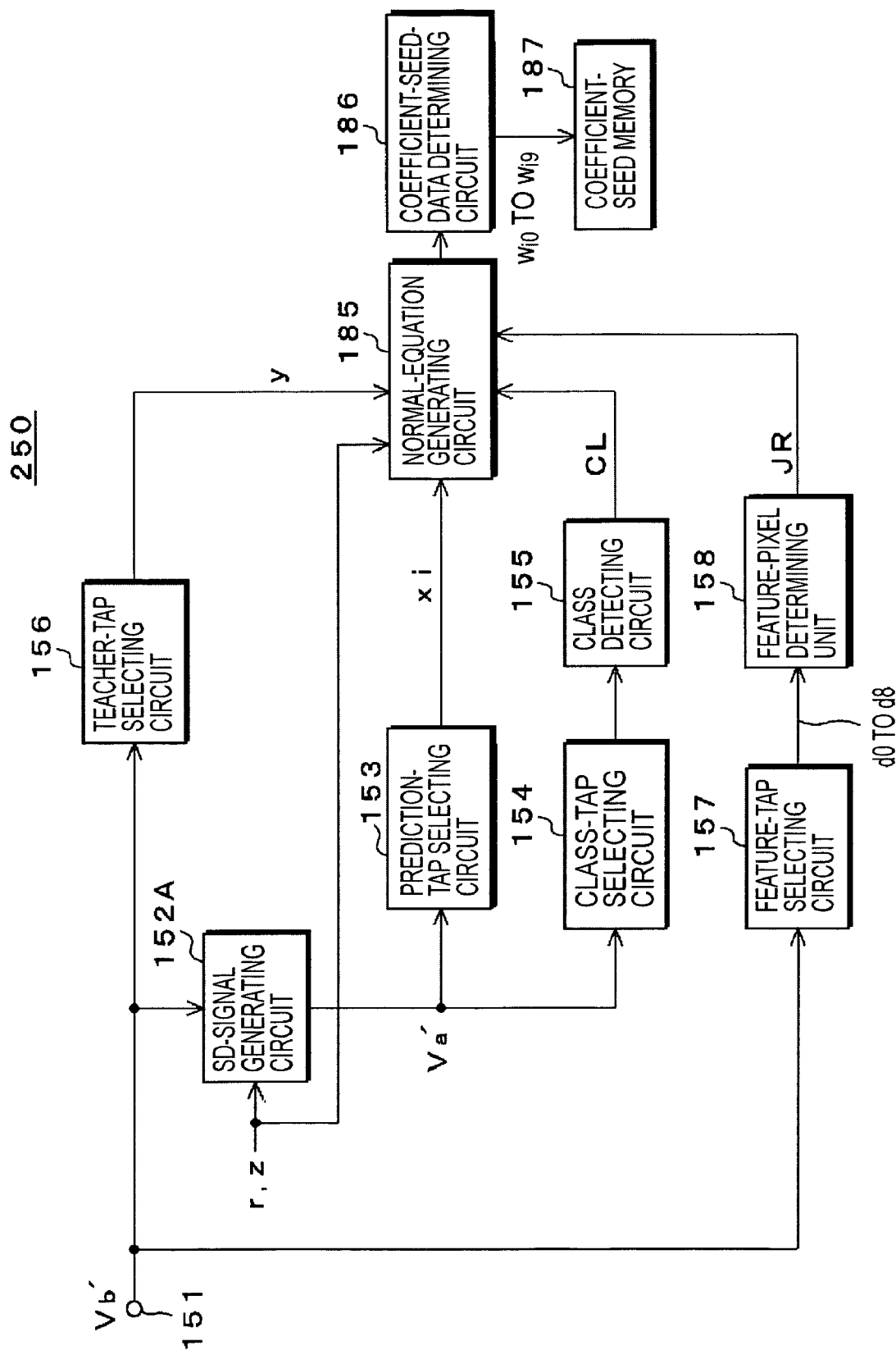
FIG. 14 is a block diagram showing the construction of a coefficient-seed-data generating apparatus.

Next, a coefficient-seed-data generating apparatus 250 for generating the coefficient-seed data wi0 to wi9 (i=1 to n) will be described. FIG. 14 shows the construction of the coefficient-seed-data generating apparatus 250. In FIG. 14, parts corresponding to those in FIG. 5 are designated by the same numerals, and descriptions thereof will be omitted as appropriate.

The coefficient-seed-data generating apparatus 250 includes an input terminal 151 and an SD-signal generating circuit 152A. The input terminal 151 is used to input an image signal Vb' as a teacher signal corresponding to the image signal Vb. The SD-signal generating circuit 152A generates an image signal Va' as a student signal corresponding to the image signal Vb by horizontally and vertically decimating the image signal Vb'. The SD-signal generating circuit 152A receives the parameters r and z. The frequency characteristics of a decimation filter used when generating the image signal Va from the image signal Vb' are changed according to the value of the parameter r. Furthermore, the amount of noise added to the SD signal is changed according to the value of the parameter z.

The coefficient-seed-data generating apparatus 250 further includes a prediction-tap selecting circuit 153 and a class-tap selecting circuit 154. The prediction-tap selecting circuit 153 and the class-tap selecting circuit 154, based on the image signal Va' generated by the SD-signal generating circuit 152A, selectively extract a plurality of pieces Qf pixel data located at peripheral positions of a subject pixel position in the image signal Vb', as prediction-tap data and class-tap data, respectively. The prediction-tap selecting circuit 153 and the class-tap selecting circuit 154 correspond to the prediction-tap selecting circuit 102 and the class-tap selecting circuit 103 of the image-signal processing apparatus 200, respectively.

The coefficient-seed-data generating apparatus 250 further includes a class detecting circuit 155. The class detecting circuit 155 processes a plurality of pieces of pixel data selectively extracted by the class-tap selecting circuit 154 as class-tap data, generating a class code CL representing a class to which pixel data at the subject pixel position in the image signal Vb' belongs. The class detecting circuit 155 corresponds to the class detecting circuit 104 of the image-signal processing apparatus 200.

The coefficient-seed-data generating apparatus 250 further includes a teacher-tap selecting circuit 156. The teacher-tap selecting circuit 156, based on the image signal Vb', selectively extracts pixel data at the subject pixel position in the image signal Vb'.

The coefficient-seed-data generating apparatus 250 further includes a feature-tap selecting circuit 157 and a feature-pixel determining unit 158. The feature-tap selecting circuit 157, based on the image signal Vb' input to the input terminal 151, selectively extracts pixel data d0 at the subject pixel position in the image signal Vb' and a plurality of pieces of pixel data d1 to d8 located at the peripheral positions (refer to FIG. 6), as feature-tap data. The feature-pixel determining unit 158, based on the plurality of pieces of pixel data d0 to d8 selectively extracted by the feature-tap selecting circuit 157, determines whether the subject pixel position in the image signal Vb' is a feature position having a predetermined feature that highly contributes to image quality, outputting a determination signal JR indicating the result.

The feature-tap selecting circuit 157 and the feature-pixel determining unit 158 correspond to those in the coefficient-data generating apparatus 150 shown in FIG. 5. The feature-pixel determining unit 158 is constructed, for example, as shown in FIG. 7 or FIG. 8. Furthermore, a low-band rejecting filter 181 (refer to FIG. 5) may be provided at a previous stage of the feature-tap selecting circuit 157 so that the pixel data d0 to d8 selectively extracted by the feature-tap selecting circuit 157 is supplied via the low-band rejecting filter 181.

The coefficient-seed-data generating apparatus 250 further includes a normal-equation generating circuit 185. The normal-equation generating circuit 185, based on the pixel data y at each subject pixel position in the image signal Vb', selectively extracted by the teacher-tap selecting circuit 156, the plurality of pieces of pixel data xi selectively extracted by the prediction-tap selecting circuit 153 as prediction-tap data associated with the pixel data y at the subject pixel position, the class code CL generated by the class detecting circuit 155 for the pixel data y at the subject pixel position, and the values of the parameters r and z, generates a normal equation (refer to equation (18)) for obtaining coefficient-seed data wi0 to wi9 for each class. The subject pixel position in the image signal Vb' herein is a pixel position determined as a feature position by the feature-pixel determining unit 158.

A single piece of learning data is generated based on a combination of a single piece of pixel data y and a plurality of pieces of pixel data xi associated therewith. A large number of pieces of learning data is generated for each class between the image signal Vb' as a teacher signal and the image signal Va' l as a corresponding student signal. Thus, the normal-equation generating circuit 185 generates normal equations for obtaining coefficient-seed data wi0 to wi9 for each class using learning data including only pixel data y at feature positions in the image signal Vb', the pixel data y at the feature positions having predetermined features that highly contribute to image quality.

The normal-equation generating circuit 185 generates a normal equation for each of the output pixels (HD1 to HD4 in FIG. 4A or HD1' to HD4' in FIG. 4B). That is, normal equations associated with HD1 to HD4 or HD1' to HD4' are generated using learning data including pixel data having the same shifts as HD1 to HD4 or HD1' to HD4' with respect to the central prediction tap SD0 or SD0'. Thus, the normal-equation generating circuit 185 generates a normal equation for obtaining coefficient-seed data wi0 to wi9 for each combination of class and output pixel.

The coefficient-seed-data generating apparatus 250 further includes a coefficient-seed-data determining circuit 186 and a coefficient-seed memory 187. The coefficient-seed-data determining circuit 186 receives data of the normal equations from the normal-equation generating circuit 185, and solves the normal equations, for example, by the sweep-out method, to obtain coefficient-seed data wi0 to wi9 for each combination of class and output pixel. The coefficient-seed memory 187 stores the coefficient-seed data wi0 to wi9 obtained by the coefficient-seed-data determining circuit 186.

Next, an operation of the coefficient-seed-data generating apparatus 250 shown in FIG. 14 will be described.

To the input terminal 151, an image signal Vb' is input as a teacher signal. The SD-signal generating circuit 152A horizontally and vertically decimates the image signal Vb' to generate an image signal Va' as a student signal. The SD-signal generating circuit 152A receives the parameters r and z as control signals, and sequentially generates a plurality of image signals Va' in which the frequency characteristics and the amount of noise added are varied in a stepwise manner.

The class-tap selecting circuit 154, based on the image signal Va', selectively extracts a plurality of pieces of pixel data located at peripheral positions of a subject pixel position in the image signal Vb', as class-tap data. The plurality of pieces of pixel data is supplied to the class detecting circuit 155. The class detecting circuit 155 compresses each of the pieces of pixel data, for example, by ADRC, and generates a class code CL representing a class to which pixel data at the subject pixel position in the image signal Vb' belongs (refer to equations (1) and (2)). The class code CL is supplied to the normal-equation generating circuit 185.

The prediction-tap selecting circuit 153, based on the image signal Va', selectively extracts a plurality of pieces of pixel data xi located at the peripheral positions of the subject pixel position in the image signal Vb', as prediction-tap data. The plurality of pieces of pixel data xi is supplied to the normal-equation generating circuit 185. The teacher-tap selecting circuit 156, based on the image signal Vb', selectively extracts pixel data y at the subject pixel position in the image signal Vb'. The pixel data y is supplied to the normal-equation generating circuit 185.

The feature-tap selecting circuit 157, based on the image signal Vb', selectively extracts pixel data d0 at the subject pixel position in the image signal Vb' and a plurality of pieces of pixel data d1 to d8 located at the peripheral positions, as feature-tap data. The pixel data d0 to d8 is supplied to the feature-pixel determining unit 158. The feature-pixel determining unit 158, based on the plurality of pieces of pixel data d0 to d8, determines whether the subject pixel position in the image signal Vb' is a feature position having a predetermined feature that highly contributes to image quality, producing a determination signal JR indicating the result. The determination signal JR is supplied to the normal-equation generating circuit 185.

The normal-equation generating circuit 185, for each subject pixel position in the image signal Vb' determined as a feature position by the feature-pixel determining unit 158, based on the pixel data y at the subject pixel position, the plurality of pieces of pixel data xi as prediction-tap data associated with the pixel data y at the subject pixel position, the class code CL representing the class to which the pixel data y at the subject pixel position belongs, and the values of the parameters r and z supplied to the SD-signal generating circuit 152A, generates a normal equation (refer to equation (18)) for obtaining coefficient-seed data wi0 to wi9 for each combination of class and output pixel.

The coefficient-seed-data determining circuit 186 receives data of the normal equations from the normal-equation generating circuit 185, and solves the normal equations, for example, by the sweep-out method, to obtain coefficient-seed data wi0 to wi9 for each combination of class and output pixel. The coefficient-seed data wi0 to wi9 is stored in the coefficient-seed memory 187.

As described above, in the coefficient-seed-data generating apparatus 250 shown in FIG. 14, coefficient-seed data wi0 to wi9 for each combination of class and output pixel, which is to be stored in the ROM 110 of the image-signal processing apparatus 200, can be generated.

As described above, the coefficient-seed data wi0 to wi9 is generated using learning data including only pixel data at feature positions in the image signal Vb' as a teacher signal, the pixel data at the feature positions having predetermined features that highly contribute to image quality. Thus, by storing the coefficient-seed data wi0 to wi9 in the ROM 110 of the image-signal processing apparatus 200 shown in FIG. 12, the image-signal processing apparatus 200 is allowed to accurately reproduce pixel data at the feature positions having the predetermined features that highly contribute to image quality. This serves to improve the image quality of an image composed of the image signal Vb.

The processing executed by the image-signal processing apparatus 200 shown in FIG. 12 may be implemented in software by the image-signal processing apparatus 500 shown in FIG. 9. A procedure of the processing will be described with reference to a flowchart shown in FIG. 15.

The procedure starts in step ST40. In step ST41, for example, an image signal Va for one frame or one field is input to the apparatus from the input terminal 515. The input image signal Va is temporarily stored in the RAM 503. When the image signal Va is recorded in advance in the HDD 505 of the apparatus, the image signal Va is read from the HDD 505 and temporarily stored in the RAM 503.

Then, in step ST42, it is determined whether processing for all the frames or all the fields of the image signal Va has been finished. If the processing has been finished, in step ST43, the procedure is exited. On the other hand, if the processing has not been finished, the procedure proceeds to step ST44.

In step ST44, the values of the parameters r and z adjusted by a user and stored in the RAM 503 are obtained. Then, in step ST45, based on the image signal Va, a plurality of pieces of pixel data located at peripheral positions of a subject pixel position in the image signal Vb is obtained as class-tap data. Then, in step ST46, based on the class-tap data, a class code representing a class to which pixel data at the subject pixel position in the image signal vb belongs is generated.

Then, in step ST47, using coefficient-seed data wi0 to wi9 associated with the class represented by the class code CL generated in step ST46 and the values of the parameters r and z obtained in step ST44, coefficient data Wi for an estimating equation is generated according to the generating equation expressed in equation (11).

Then, in step ST48, based on the image signal Va, a plurality of pieces of pixel data xi located at the peripheral positions of the subject pixel position in the image signal Vb is obtained as prediction-tap data. Then, in step ST49, using the coefficient data Wi generated in step ST47 and the plurality of pieces of pixel data xi obtained in step ST48, pixel data y at the subject pixel position in the image signal Vb is generated according to the estimating equation expressed in equation (3).

Then, in step ST50, it is determined whether the processing for calculating pixel data of the image signal Vb in the entire region of the pixel data of the image signal Va for one frame or one field, input in step ST41, has been finished. If the processing has been finished, the procedure returns to step ST41, entering processing for inputting an image signal Va of a next one frame or one field. On the other hand, if the processing has not been finished, the procedure returns to step ST45, entering processing for a next subject pixel position.

Figure 15:
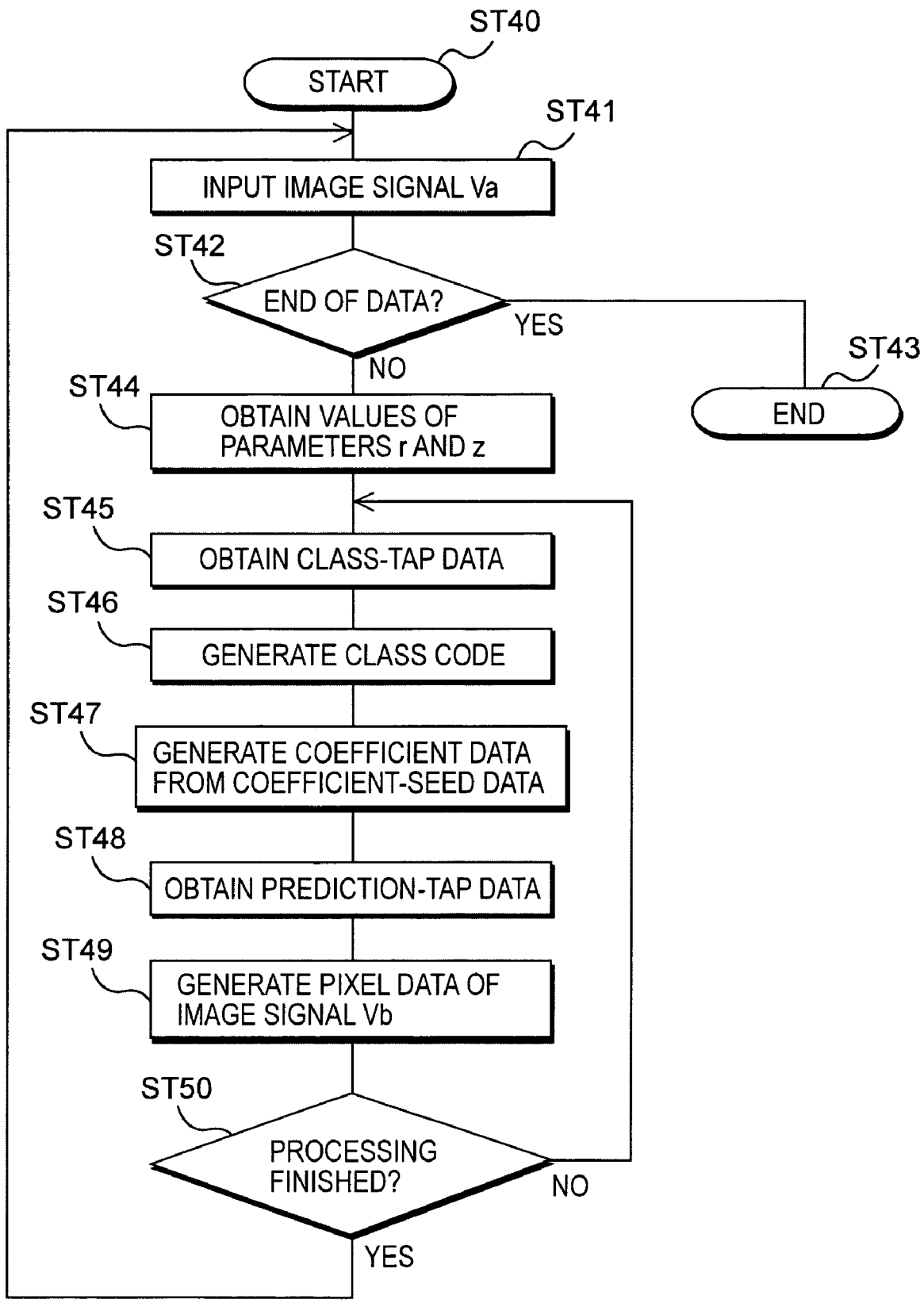
FIG. 15 is a flowchart showing a procedure of image signal processing.

As described above, by executing processing according to the flowchart shown in FIG. 15, it is possible to obtain pixel data of an image signal vb by processing pixel data of an input image signal Va. The image signal Vb is output to the output terminal 517, supplied to the display 513 to display a corresponding image, or supplied to and recorded on the HDD 505.

Although a processing apparatus is not shown, the processing executed by the coefficient-seed-data generating apparatus 250 shown in FIG. 14 can also be implemented in software.

Now, a procedure of processing for generating coefficient-seed data will be described with reference to a flowchart shown in FIG. 16.

The procedure starts in step ST60. Then, in step ST61, the values of the parameters r and z that specify an image quality pattern are selected. Then, in step ST62, it is determined whether learning has been finished for all combinations of the values of the parameters r and z. When the learning has not been finished for all the combinations, in step ST63, an image signal Vb' for one frame or one field is input as a teacher signal.

Then, in step ST64, it is determined whether processing for all the frames or all the fields of the image signal Vb' has been finished. If the processing has been finished, the procedure returns to step ST61, in which the values of the parameters r and z are selected, and the procedure described above is repeated. On the other hand, if the processing has not been finished, in step ST65, the image signal Vb' input in step ST63 is horizontally and vertically decimated to generate an image signal Va' as a student signal. The frequency characteristics of a decimation filter that is used to generate the image signal Va from the image signal Vb' are varied according to the value of the parameter r. Furthermore, the amount of noise added to the image signal Va' is varied according to the value of the parameter z.

Then, in step ST66, based on the image signal Vb', pixel data d0 at a subject pixel position in the image signal Vb' and pixel data d1 to d8 at peripheral positions of the subject pixel position are obtained as feature-tap data. Then, in step ST67, based on the pixel data d0 to d8 obtained in step ST66, it is determined whether the subject pixel position is a feature position having a predetermined feature that highly contributes to image quality. For example, the subject pixel position is determined as a feature position when the pixel data d0 at the subject pixel position is greater than a maximum value MAX or less than a minimum value MIN of the pixel data d1 to d8 at the peripheral positions.

When the subject pixel position is determined as a feature position, the procedure proceeds to step ST68. In step ST68, based on the image signal Va', a plurality of pieces of pixel data located at the peripheral positions of the subject pixel position in the image signal Vb' is obtained as class-tap data. Then, in step ST69, based on the class-tap data, a class code CL representing a class to which pixel data at the subject pixel position in the image signal Vb' belongs is generated.

Then, in step ST70, based on the image signal Va', a plurality of pieces of pixel data xi located at the peripheral positions of the subject pixel position in the image signal Vb' is obtained as prediction-tap data. Then, in step ST71, based on the image signal Vb', pixel data y at the subject pixel position in the image signal Vb' is obtained as teacher-tap data.

Then, in step ST72, using the class code CL generated in step ST69, the plurality of pieces of pixel data xi obtained in step ST70, the pixel data y obtained in step ST71, and the values of the parameters r and z selected in step ST61, summation for yielding the normal equation expressed in equation (18) is performed for each combination of class and output pixel (refer to equations (16) and (17)).

After step ST72, the procedure proceeds to step ST73. When it is determined in step ST67 that the subject pixel position is not a feature position, the procedure immediately proceeds to step ST73. Thus, in step ST72, normal equations are generated using learning data including only pixel data at feature positions in the image signal Vb' as a teacher signal, the pixel data at the feature positions having predetermined features that highly contribute to image quality.

In step ST73, it is determined whether learning has been finished for the entire region of the pixel data of the image signal Vb' for one frame or one field, input in step ST63. When the learning has been finished, the procedure returns to step ST63, in which an image signal Vb' for a next one frame or one field is input, and the procedure described above is repeated. On the other hand, when the learning has not been finished, the procedure returns to step ST66, entering processing for a next subject pixel position.

When it is determined in step ST62 that the learning has been finished for all the combinations of the values of the parameters r and z, in step ST74, the normal equations yielded by the summation in step ST72 are solved to obtain coefficient-seed data wi0 to wi9 for each combination of class and output pixel. Then, in step ST75, the coefficient-seed data wi0 to wi9 is stored in a coefficient memory. Then, in step ST76, the procedure is exited.

Figure 16:
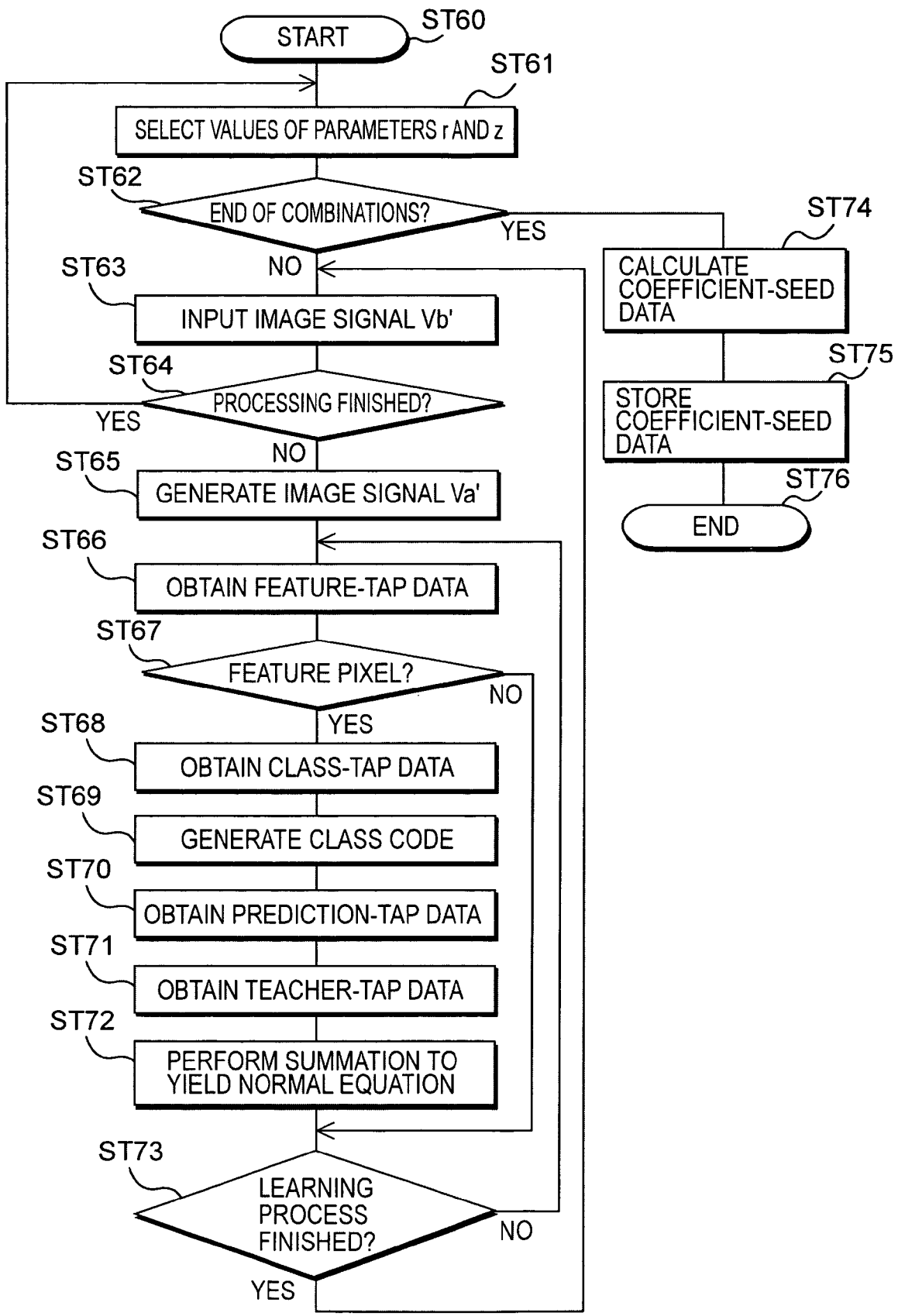
FIG. 16 is a flowchart showing a procedure of generating coefficient-seed data.

As described above, by executing processing according to the flowchart shown in FIG. 16, coefficient-seed data wi0 to wi9 can be generated by the same method used by the coefficient-seed-data generating apparatus 250 shown in FIG. 14.

Although the embodiments have been described in the context of examples where information signals are image signals, the present invention is not limited thereto. For example, the embodiments can be equally applied to cases where information signals are audio signals.

According to the embodiments of the present invention, when coefficient data for an estimating equation that is used to convert a first information signal into a second information signal, or coefficient-seed data for generating the coefficient data, is obtained by performing learning based on a student signal corresponding to the first information signal and a teacher signal corresponding to the second information signal, learning data including only information data at feature positions having predetermined features in the teacher signal is used. Thus, coefficient data or coefficient-seed data that allows accurate reproduction of information data at the feature positions having the predetermined features can be obtained. Accordingly, the quality of an output composed of the second information signal can be improved.

It should be understood by those skilled in the art that various modifications, combinations, sub-combinations and alterations may occur depending on design requirements and other factors insofar as they are within the scope of the appended claims or the equivalents thereof.

What is claimed is:

1. A coefficient-data generating apparatus for generating coefficient data for converting a standard definition image signal, which is a first information signal, into a high-definition image signal, which is a second information signal, the coefficient-data generating apparatus comprising:

determining means for determining a subject point in a second learning signal corresponding to the second information signal as a feature point having a predetermined feature when the information data at the subject point is greater than a maximum value of the plurality of pieces of information data at adjacent points, or when the information data at the subject point is less than a minimum value of the plurality of pieces of information data at adjacent points;

data selecting means for selecting a plurality of pieces of information data at the subject point which is determined as the feature point by the determining means, and the plurality of pieces of information data at peripheral positions of the subject point in the second learning signal, based on a first learning signal corresponding to the first information signal; and calculating means for calculating the coefficient data using information data at the subject point which is determined as the feature point by the determining means, and the plurality of pieces of information data at peripheral positions of the subject point in the second learning signal by the data selecting means, wherein the coefficient data is used to generate pixel data, and the pixel data is provided to an output terminal.

2. The coefficient-data generating apparatus according to claim 1, further comprising class detecting means for detecting a class to which the information data at the subject point in the second learning signal belongs, based on the first learning signal, wherein the calculating means calculates the coefficient data for each class using the class detected in association with the subject point by the class detecting means together with the information data at the subject point in the second learning signal, the subject point being determined as the feature point by the determining means, and the plurality of pieces of information data selected in association with the subject point by the data selecting means.

3. The coefficient-data generating apparatus according to claim 1, wherein the calculating means includes:

a normal-equation generator that generates a normal equation for obtaining the coefficient data, using the information data at the subject point in the second learning signal, the subject point being determined as the feature point by the determining means, and the plurality of pieces of information data selected in association with the subject point by the data selecting means; and a coefficient-data calculator that calculates the coefficient data by solving the normal equation generated by the normal-equation generator.

4. The coefficient-data generating apparatus according to claim 1, wherein the determining means determines that the subject point is the feature point when the information data at the subject point is greater than a maximum value of the plurality of pieces of information data at the adjacent points or less than a minimum value of the plurality of pieces of information data at the adjacent points.

5. The coefficient-data generating apparatus according to claim 1, wherein the determining means determines that the subject point is the feature point when the information data at the subject point coincides with a median of the plurality of pieces of information data at the adjacent points or a median of the information data at the subject point and the plurality of pieces of information data at the adjacent points.

6. The coefficient-data generating apparatus according to claim 1, wherein the information data at the subject point and the information data at the adjacent points are obtained via a low-band rejecting filter.

7. A coefficient-data generating method for generating coefficient data of an estimating equation for converting a standard definition image signal, which is a first information signal, into a high-definition image signal, which is a second information signal, the coefficient-data generating method comprising the steps of:

determining a subject point in a second learning signal corresponding to the second information signal as a feature point having a predetermined feature when the information data at the subject point is greater than a maximum value of the plurality of pieces of information data at adjacent points, or when the information data at the subject point is less than a minimum value of the plurality of pieces of information data at adjacent points;

selecting a plurality of pieces of information data at the subject point which is determined as the feature point, and the plurality of pieces of information data at peripheral positions of the subject point in the second learning signal, based on a first learning signal corresponding to the first information signal; and calculating the coefficient data using information data at the subject point which is determined as the feature point, and the plurality of pieces of information data at peripheral positions of the subject point in the second learning signal in the selecting step, wherein the coefficient data is used to generate pixel data, and the pixel data is provided to an output terminal.

8. A computer-readable medium having recorded thereon a program that allows a computer to execute a coefficient-data generating method for generating coefficient data of an estimating equation for converting a standard definition image signal, which is a first information signal, into a high-definition image signal, which is a second information signal, the program comprising the steps of:

determining a subject point in a second learning signal corresponding to the second information signal as a feature point having a predetermined feature when the information data at the subject point is greater than a maximum value of the plurality of pieces of information data at adjacent points, or when the information data at the subject point is less than a minimum value of the plurality of pieces of information data at adjacent points;

selecting a plurality of pieces of information data of the subject point which is determined as the feature point, and the plurality of pieces of information data at peripheral positions of the subject point in the second learning signal, based on a first learning signal corresponding to the first information signal; and calculating the coefficient data using information data at the subject point which is determined as the feature point, and the plurality of pieces of information data at peripheral positions of the subject point in the second learning signal in the selecting step, wherein the coefficient data is used to generate pixel data, and the pixel data is provided to an output terminal.

9. An information-signal processing apparatus for converting a standard definition image signal, which is a first information signal, into a high-definition image signal, which is a second information signal, the information-signal processing apparatus comprising:

data selecting means for selecting a plurality of pieces of information data of a subject point which is determined as a feature point, and the plurality of pieces of information data at peripheral positions of the subject point in the second information signal, based on the first information signal;

storage means for storing coefficient data of an estimating equation; and calculating means for calculating information data at the subject point in the second information signal according to the estimating equation, using the plurality of pieces of information data selected by the data selecting means and the coefficient data stored in the storage means;

wherein the coefficient data is obtained using information data at a feature point having a predetermined feature in a second learning signal corresponding to the second information signal, and using a plurality of pieces of information data at adjacent points of the feature point in the second learning signal, selected based on a first learning signal corresponding to the first information signal, and wherein the subject point is determined as the feature point when the information data at the subject point is greater than a maximum value of the plurality of pieces of information data at adjacent points, or when the information data at the subject point is less than a minimum value of the plurality of pieces of information data at adjacent points, wherein the coefficient data is used to generate pixel data, and the pixel data is provided to an output terminal.

10. A coefficient-seed-data generating apparatus for generating coefficient-seed data of a generating equation for generating coefficient data of an estimating equation for converting a standard definition image signal. which is a first information signal, into a high-definition image signal, which is a second information signal, the coefficient-seed-data generating apparatus comprising:

parameter inputting means for receiving input of a value of a parameter that determines quality of an output that is obtained based on a first learning signal corresponding to the first information signal, the parameter corresponding to a parameter included in the generating equation;

determining means for determining a subject point in a second learning signal corresponding to the second information signal as a feature point having a predetermined feature when the information data at the subject point is greater than a maximum value of the plurality of pieces of information data at adjacent points, or when the information data at the subject point is less than a minimum value of the plurality of pieces of information data at adjacent points;

data selecting means for selecting a plurality of pieces of information data at the subject point which is determined as the feature point by the determining means, and the plurality of pieces of information data at peripheral positions of the subject point in the second learning signal, based on the first learning signal; and calculating means for calculating the coefficient-seed data using information data at the subject point which is determined as the feature point by the determining means, the plurality of pieces of information data at peripheral positions of the subject point in the second learning signal by the data selecting means, and the value of the parameter input to the inputting means, wherein the coefficient-seed data is used to generate pixel data, and the pixel data is provided to an output terminal.

11. The coefficient-seed-data generating apparatus according to claim 10, further comprising class detecting means for detecting a class to which the information data at the subject point in the second learning signal belongs, based on the first learning signal, wherein the calculating means calculates the coefficient-seed data for each class using the class detected in association with the subject point by the class detecting means together with the information data at the subject point in the second learning signal, the subject point being determined as the feature point by the determining means, the plurality of pieces of information data selected in association with the subject point by the data selecting means, and the value of the parameter input to the inputting means.

12. The coefficient-seed-data generating apparatus according to claim 10, wherein the calculating means includes:

a normal-equation generator that generates a normal equation for obtaining the coefficient-seed data using the information data at the subject point in the second learning signal, the subject point being determined as the feature point by the determining means, the plurality of pieces of information data selected in association with the subject point by the data selecting means, and the value of the parameter input to the inputting means; and a coefficient-seed-data calculator that calculates the coefficient-seed data by solving the normal equation generated by the normal-equation generator.

13. The coefficient-seed-data generating apparatus according to claim 10, wherein the determining means determines that the subject point is the feature point when the information data at the subject point is greater than a maximum value of the plurality of pieces of information data at the adjacent points or less than a minimum value of the plurality of pieces of information data at the adjacent points.

14. The coefficient-seed-data generating apparatus according to claim 10, wherein the determining means determines that the subject point is the feature point when the information data at the subject point coincides with a median of the plurality of pieces of information data at the adjacent points or a median of the information data at the subject point and the plurality of pieces of information data at the adjacent points.

15. The coefficient-seed-data generating apparatus according to claim 10, wherein the information data at the subject point and the plurality of pieces of information data at the adjacent points are obtained via a low-band rejecting filter.

16. A coefficient-seed-data generating method for generating coefficient-seed data of a generating equation for converting a standard definition image signal, which is a first information signal, into a high-definition image signal, which is a second information signal, the coefficient-seed-data generating method comprising the steps of:

obtaining a value of a parameter that determines quality of an output that is obtained based on a first learning signal corresponding to the first information signal, the parameter corresponding to a parameter included in the generating equation;

determining a subject point in a second learning signal corresponding to the second information signal as a feature point having a predetermined feature when the information data at the subject point is greater than a maximum value of the plurality of pieces of information data at adjacent points, or when the information data at the subject point is less than a minimum value of the plurality of pieces of information data at adjacent points;

selecting a plurality of pieces of information data at the subject point which is determined as the feature point, and the plurality of pieces of information data at peripheral positions of the subject point in the second learning signal, based on the first learning signal; and calculating the coefficient-seed data using information data at the subject point which is determined as the feature point, the plurality of pieces of information data at peripheral positions of the subject point in the second learning signal the selecting step, and the value of the parameter obtained in the obtaining step, wherein the coefficient-seed data is used to generate pixel data, and the pixel data is provided to an output terminal.

17. A computer-readable medium having recorded thereon a program that allows a computer to execute a coefficient-seed-data generating method for generating coefficient-seed data of a generating equation for converting a standard definition image signal, which is a first information signal, into a high-definition image signal, which is a second information signal, the program comprising the steps of:

obtaining a value of a parameter that determines quality of an output that is obtained based on a first learning signal corresponding to the first information signal, the parameter corresponding to a parameter included in the generating equation;

determining a subject point in a second learning signal corresponding to the second information signal as a feature point having a predetermined feature when the information data at the subject point is greater than a maximum value of the plurality of pieces of information data at adjacent points, or when the information data at the subject point is less than a minimum value of the plurality of pieces of information data at adjacent points;

selecting a plurality of pieces of information data at the subject point which is determined as the feature point, and the plurality of pieces of information data at peripheral positions of the subject point in the second learning signal, based on the first learning signal; and calculating the coefficient-seed data using information data at the subject point which is determined as the feature point, the plurality of pieces of information data at peripheral positions of the subject point in the second learning signal by the selecting step, and the value of the parameter obtained in the obtaining step, wherein the coefficient-seed data is used to generate pixel data, and the pixel data is provided to an output terminal.

18. An apparatus for converting a standard definition image signal, which is a first information signal, into a high-definition image signal, which is a second information signal, the apparatus comprising:

data selecting means for selecting a plurality of pieces of information data at a subject point which is determined as a feature point by the determining means, and the plurality of pieces of information data at peripheral positions of the subject point in the second information signal, based on the first information signal;

parameter inputting means for receiving input of a value of a parameter that determines quality of an output that is obtained based on the second information signal;

storage means for storing coefficient-seed data that serves as coefficient data of a generating equation for generating coefficient data of an estimating equation, the generating equation including the parameter;

coefficient-data generating means for generating coefficient data of the estimating equation according to the generating equation in accordance with the value of the parameter input to the parameter inputting means, using the coefficient-seed data stored in the storage means and the value of the parameter input to the parameter inputting means; and calculating means for calculating information data at a subject point in the second information signal according to the estimating equation, using the plurality of pieces of information data selected by the data selecting means and the coefficient data generated by the coefficient-data generating means;

wherein the coefficient-seed data is obtained using information data at a feature point having a predetermined feature in a second learning signal corresponding to the second information signal, a plurality of pieces of information data at adjacent points of the subject point in the second learning signal, the plurality of pieces of information data selected based on a first learning signal corresponding to the first information signal, and a value of a parameter that determines quality of an output that is obtained based on the first information signal, and wherein the subject point is determined as the feature point when the information data at the subject point is greater than a maximum value of the plurality of pieces of information data at adjacent points, or when the information data at the subject point is less than a minimum value of the plurality of pieces of information data at adjacent points, wherein the coefficient data is used to generate pixel data, and the pixel data is provided to an output terminal.

19. A coefficient-data generating apparatus for generating coefficient data of an estimating equation for converting a standard definition image signal, which is a first information signal, into a high-definition image signal, which is a second information signal, the coefficient-data generating apparatus comprising:

a determining unit determining a subject point in a second learning signal corresponding to the second information signal as a feature point having a predetermined feature when the information data at the subject point is greater than a maximum value of the plurality of pieces of information data at adjacent points, or when the information data at the subject point is less than a minimum value of the plurality of pieces of information data at adjacent points;

a data selector selecting a plurality of pieces of information data at of the subject point which is determined as the feature point, and the plurality of pieces of information data at peripheral positions of the subject point in the second learning signal, based on a first learning signal corresponding to the first information signal; and a calculator calculating the coefficient data using information data at the subject point which is determined as the feature point, and the plurality of pieces of information data at peripheral positions of the subject point in the second learning signal by the data selector, wherein the coefficient data is used to generate pixel data, and the pixel data is provided to an output terminal.

20. An information-signal processing apparatus for converting a standard definition image signal, which is a first information signal, into a high-definition image signal, which is a second information signal, the information-signal processing apparatus comprising:

a data selector selecting a plurality of pieces of information data at adjacent points of a subject point in the second information signal, based on the first information signal;

a storage device storing coefficient data of an estimating equation; and a calculator calculating information data at the subject point in the second information signal according to the estimating equation, using the plurality of pieces of information data selected by the data selector and the coefficient data stored in the storage device;

wherein the coefficient data is obtained using information data at a feature point having a predetermined feature in a second learning signal corresponding to the second information signal, and using a plurality of pieces of information data at adjacent points of the feature point in the second learning signal, the plurality of pieces of information data being selected based on a first learning signal corresponding to the first information signal, and wherein the subjected point is determined as the feature point when the information data at the subject point is greater than a maximum value of the plurality of pieces of information data at adjacent points, or when the information data at the subject point is less than a minimum value of the plurality of pieces of information data at adjacent points, wherein the coefficient data is used to generate pixel data, and the pixel data is provided to an output terminal.

21. A coefficient-seed-data generating apparatus for generating coefficient-seed data of a generating equation for generating coefficient data of an estimating equation for converting a standard definition image signal, which is a first information signal, into a high-definition image signal, which is a second information signal, the coefficient-seed-data generating apparatus comprising:
- a parameter inputting unit receiving input of a value of a parameter that determines quality of an output that is obtained based on a first learning signal corresponding to the first information signal, the parameter corresponding to a parameter included in the generating equation;
- a determining unit determining a subject point in a second learning signal corresponding to the second information signal as a feature point having a predetermined feature when the information data at the subject point is greater than a maximum value of the plurality of pieces of information data at adjacent points, or when the information data at the subject point is less than a minimum value of the plurality of pieces of information data at adjacent points;
- a data selector selecting a plurality of pieces of information data at of the subject point which is determined as the feature point, and the plurality of pieces of information data at peripheral positions of the subject point in the second learning signal, based on the first learning signal; and
- a calculator calculating the coefficient-seed data using information data at the subject point which is determined as the feature point, the plurality of pieces of information data at peripheral positions of the subject point in the second learning signal by the data selector, and the value of the parameter input to the inputting unit,
- wherein the coefficient-seed data is used to generate pixel data, and the pixel data is provided to an output terminal.

22. An apparatus for converting a standard definition image signal, which is a first information signal, into a high-definition image signal, which is a second information signal, the apparatus comprising:
- a data selector selecting a plurality of pieces of information data at a subject point which is determined as a feature point, and the plurality of pieces of information data at peripheral positions of the subject point in the second information signal, based on the first information signal;
- a parameter inputting unit receiving input of a value of a parameter that determines quality of an output that is obtained based on the second information signal;
- a storage device storing coefficient-seed data that serves as coefficient data of a generating equation for generating coefficient data of an estimating equation, the generating equation including the parameter;
- a coefficient-data generator generating coefficient data of the estimating equation according to the generating equation in accordance with the value of the parameter input to the parameter inputting unit, using the coefficient-seed data stored in the storage device and the value of the parameter input to the parameter inputting unit; and
- a calculator calculating information data at a subject point in the second information signal according to the estimating equation, using the plurality of pieces of information data selected by the data selector and the coefficient data generated by the coefficient-data generator;
- wherein the coefficient-seed data is obtained using information data at a feature point having a predetermined feature in a second learning signal corresponding to the second information signal, a plurality of pieces of information data at adjacent points of the subject point in the second learning signal, the plurality of pieces of information data selected based on a first learning signal corresponding to the first information signal, and a value of a parameter that determines quality of an output that is obtained based on the first information signal, and
- wherein the subject point is determined as the feature point when the information data at the subject point is greater than a maximum value of the plurality of pieces of information data at adjacent points, or when the information data at the subject point is less than a minimum value of the plurality of pieces of information data at adjacent points,
- wherein the coefficient-seed data is used to generate pixel data, and the pixel data is provided to an output terminal.

* * * * *